United States Patent
Yoshihara et al.

(10) Patent No.: US 9,317,200 B2
(45) Date of Patent: Apr. 19, 2016

(54) DISPLAY APPARATUS AND DISPLAY METHOD THEREOF

(75) Inventors: Tomoya Yoshihara, Kanagawa (JP); Akinori Wada, Kanagawa (JP); Futoshi Iwashita, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 1134 days.

(21) Appl. No.: 13/061,084

(22) PCT Filed: Aug. 28, 2009

(86) PCT No.: PCT/JP2009/065123
§ 371 (c)(1),
(2), (4) Date: Feb. 25, 2011

(87) PCT Pub. No.: WO2010/024416
PCT Pub. Date: Mar. 4, 2010

(65) Prior Publication Data
US 2011/0181536 A1    Jul. 28, 2011

(30) Foreign Application Priority Data

Aug. 28, 2008  (JP) ................. 2008-220581
Sep. 26, 2008  (JP) ................. 2008-247773

(51) Int. Cl.
*G06F 3/0488*    (2013.01)
*G06F 3/023*     (2006.01)
(Continued)

(52) U.S. Cl.
CPC .......... *G06F 3/04886* (2013.01); *G06F 3/0233* (2013.01); *G06F 3/045* (2013.01); *G06F 17/276* (2013.01)

(58) Field of Classification Search
CPC ....... G06F 3/041; G06F 3/0418; G06F 17/27; G06F 3/04886; G06F 3/0237; G06F 17/276; G06F 3/0482; G06F 17/273; G06F 3/18; G06F 3/0489; G06F 3/04895; G06F 3/04883; G09G 5/00; H03M 1/22

USPC .................... 704/2; 345/156, 173; 341/22, 24
See application file for complete search history.

(56) References Cited

U.S. PATENT DOCUMENTS

| | | |
|---|---|---|
| 2002/0019731 A1 | 2/2002 | Masui et al. |
| 2004/0140913 A1 | 7/2004 | Engelmann et al. |

(Continued)

FOREIGN PATENT DOCUMENTS

| | | |
|---|---|---|
| JP | 62-034220 | 2/1987 |
| JP | 10-275046 | 10/1998 |

(Continued)

OTHER PUBLICATIONS

Japanese Office Action "Notification of Reasons for Refusal" drafted Oct. 12, 2012, and dated Oct. 16, 2012, which corresponds to Japanese Patent Application No. 2008-220581 and is related to U.S. Appl. No. 13/061,084 with translation.

(Continued)

*Primary Examiner* — Grant Sitta
*Assistant Examiner* — Amen Bogale
(74) *Attorney, Agent, or Firm* — Studebaker & Brackett PC

(57) ABSTRACT

Desired character information can be effectively obtained. The display apparatus (display terminal) includes a display part, a plurality of operation portions, to which different characters are assigned and which are provided adjacent to one another, an operation detection part which detects operation states of the plurality of operation portions, and a control part which displays character information about a character assigned to an operation portion, to which an operation is detected by the operation detection part, wherein if it is determined that a first operation portion among the plurality of operation portions is operated based on detection of an operation state by the operation detection part, the control part displays character information about a character assigned to the first operation portion on the display part, and further specifies a second operation portion associated with the first operation portion based on the operation state to the first operation portion, and displays character information about a character assigned to the second operation portion on the display part.

20 Claims, 19 Drawing Sheets

(51) Int. Cl.
*G06F 3/045* (2006.01)
*G06F 17/27* (2006.01)

(56) References Cited

U.S. PATENT DOCUMENTS

| | | | | |
|---|---|---|---|---|
| 2004/0183833 A1* | 9/2004 | Chua | .................... | G06F 3/0237 715/773 |
| 2008/0167858 A1* | 7/2008 | Christie | ................ | G06F 3/0237 704/10 |
| 2009/0024465 A1* | 1/2009 | Burckart | ............. | G06F 17/3064 705/14.54 |

FOREIGN PATENT DOCUMENTS

| | | |
|---|---|---|
| JP | 2001-236180 A | 8/2001 |
| JP | 2001-325252 A | 11/2001 |
| JP | 2003-99180 A | 4/2003 |
| JP | 2003-150302 A | 5/2003 |
| JP | 2004-192638 A | 7/2004 |
| JP | 2007-304966 A | 11/2007 |
| JP | 2001-147938 A | 5/2011 |

OTHER PUBLICATIONS

Japanese Office Action "Notification of Reasons for Refusal" dated Nov. 13, 2012, which corresponds to Japanese Patent Application No. 2008-247773 and is related to U.S. Appl. No. 13/061,084 with translation.

An Office Action "Decision of Refusal" issued by the Japanese Patent Office on Jul. 2, 2013, which corresponds to Japanese Patent Application No. 2008-247773 and is related to U.S. Appl. No. 13/061,084; with concise explanation.

Japanese Office Action "Final Rejection" dated Mar. 26, 2013, which corresponds to Japanese Patent Application No. 2008-220581 and is related to U.S. Appl. No. 13/061,084 with translation.

First Office Action issued by the State Intellectual Property Office of People's Republic of China on Jan. 14, 2013, which corresponds to Chinese Patent Application No. 200980133823.9 and is related to U.S. Appl. No. 13/061,084 with English translation.

An Office Action "Notice of Reasons for Rejection," issued by the Japanese Patent Office on Jul. 8, 2014, which corresponds to Japanese Patent Application No. 2008-220581 and is related to U.S. Appl. No. 13/061,084; with English language concise explanation.

* cited by examiner

FIG. 4

| KEY | CHARACTER ENTERING MODE ||| NUMERAL MODE (FULL SIZE/HALF SIZE) |
| --- | --- | --- | --- | --- |
|  | KANJI HIRAGANA MODE | KATAKANA MODE (FULL SIZE/HALF SIZE) | ENGLISH CHARACTER MODE (FULL SIZE/HALF SIZE) |  |
| 1 | あいうえおぁぃぅぇぉ | アイウエオァィゥェォ | .@-_/:~1 | 1 |
| 2 | かきくけこ | カキクケコ | abcABC2 | 2 |
| 3 | さしすせそ | サシスセソ | defDEF3 | 3 |
| 4 | たちつてとっ | タチツテトッ | ghiGHI4 | 4 |
| 5 | なにぬねの | ナニヌネノ | jklJKL5 | 5 |
| 6 | はひふへほ | ハヒフヘホ | mnoMNO6 | 6 |
| 7 | まみむめも | マミムメモ | pqrsPQRS7 | 7 |
| 8 | やゆよゃゅょ | ヤユヨャュョ | tuvTUV8 | 8 |
| 9 | らりるれろ | ラリルレロ | wxyzWXYZ9 | 9 |
| 0 | わをん— (PROLONGED SOUND) 、。！？ ⬚ (SPACE) | FULL SIZE ワヲンー (PROLONGED SOUND) 、。！？ ⬚ (SPACE) / HALF SIZE ﾜｦﾝｰ (PROLONGED SOUND) ､｡!? ⬚ (SPACE) | ,.!? ⬚ (SPACE) 0 | 0 |
| * | ゛(DAKUTEN)  ゜(HAN-DAKUTEN) | ゛(DAKUTEN)  ゜(HAN-DAKUTEN) |  | * |
| # | WHEN CHARACTER IS UNDECIDED: REVERSE ORDER DISPLAY / AFTER CHARACTER IS DECIDED: ↓ (LINE BRAKE) ||| WHEN ENTERING DIAL: # OTHER THAN ENTERING DIAL: ↓ (LINE BRAKE) |

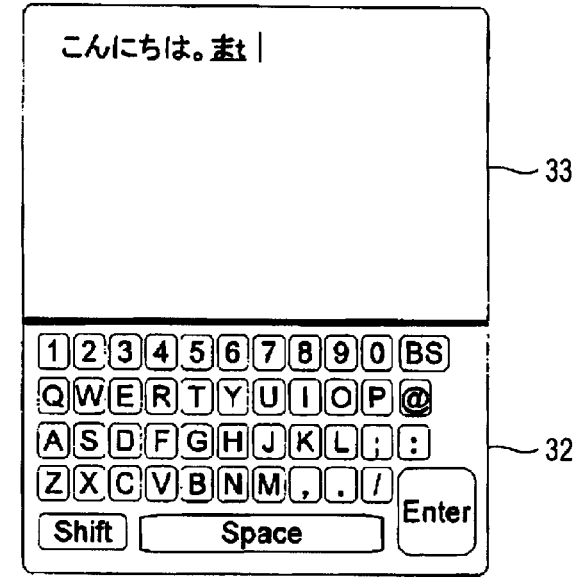
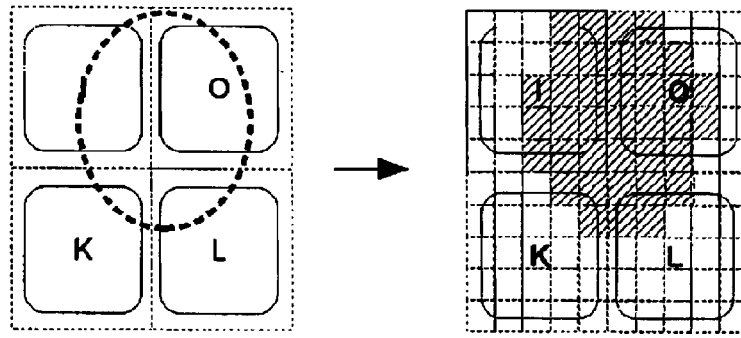
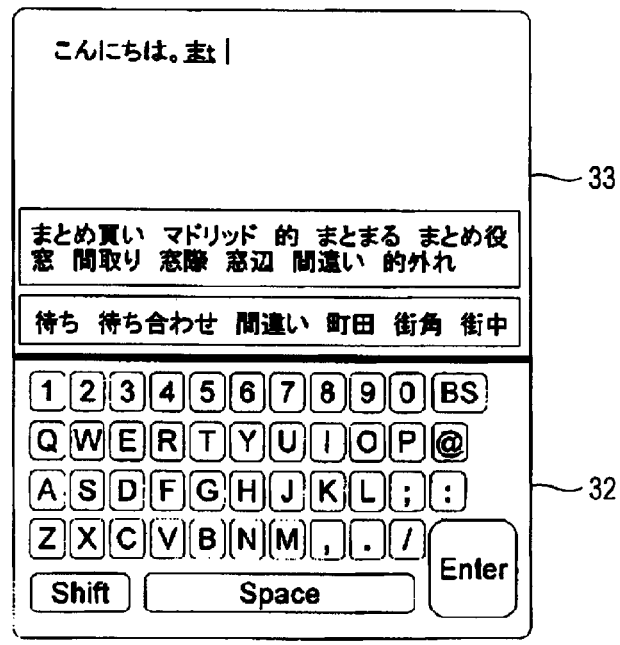
FIG. 17

FIG. 20

| KEY ID | AREA | PRESS RATIO | TOGGLE COUNTER |
|--------|------|-------------|----------------|
| 1 | 15 | 60% | 0 |
| 2 | 11 | 44% | 0 |
| 4 | 14 | 16% | 0 |
| 5 | 1 | 4% | 0 |

FIG. 21
(a)
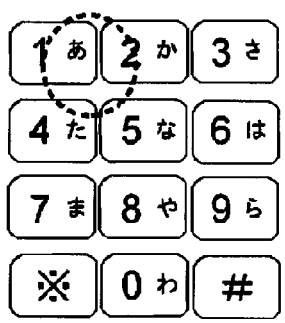
PRESS RATIO: "1" 60%  "2" 44%
"4" 16%  "5" 4%
(b)
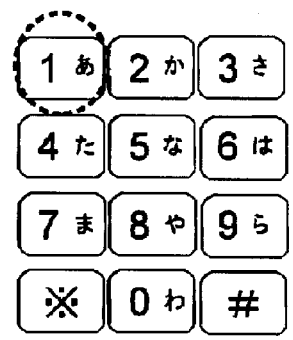
PRESS RATIO: "1" 100%  "2" 0%
"4" 0%  "5" 0%
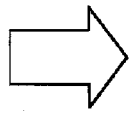
(c)
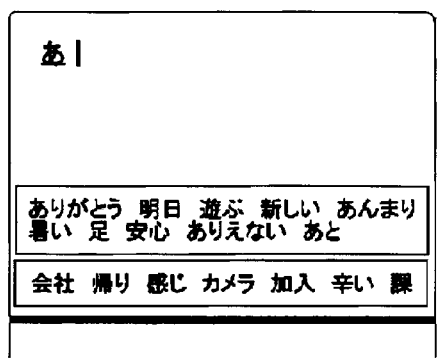
(d)
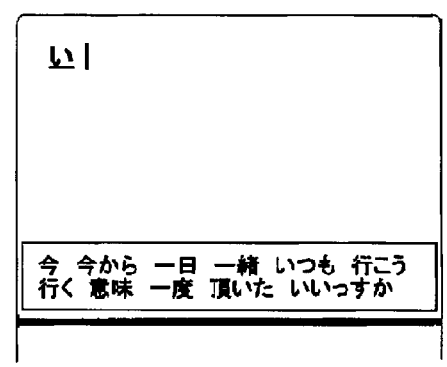

DISPLAY APPARATUS AND DISPLAY METHOD THEREOF

TECHNICAL FIELD

The present invention relates to a display apparatus, which includes a display portion for displaying character information about at least characters, and a display method thereof.

BACKGROUND ART

In portable terminals such as portable telephones, it has been known that when entering characters by operating operation portions such as keys to which characters are assigned, character information such as conversion candidates or expected entry candidates for the operated characters of the operation portions are displayed on the display portion. For example, in consideration of a key pressing error, a portable terminal, in which even if a key, not a key that should have been pressed, has been pressed, conversion candidates for characters assigned to keys adjacent to the actually pressed key are displayed on the display portion (refer to Patent Document 1).

BACKGROUND ART DOCUMENT

Patent Document

Patent Document 1: Japanese Patent Application Publication No. 2007-304966

SUMMARY OF THE INVENTION

Problems to be Solved by the Invention

However, in the background-art portable terminal disclosed as a display apparatus in Patent Document 1, character information about characters assigned to operation portions adjacent to the operated operation portion is uniformly displayed on the display portion. Therefore, the display portion displays even character information that a user has desired with low possibility. Accordingly, character information displayed on the display portion of the display apparatus increases, so that desired character information cannot be effectively obtained.

The present invention has been made in consideration of the above problem, and an objective is to provide a display apparatus, which is capable of effectively displaying character information on a display portion, and a display method thereof.

Means for Solving the Problem

In order to solve the above-described problem, a display apparatus according to the present invention includes:
 a display part;
 a plurality of operation portions, to which different characters are assigned, respectively, and which are provided adjacent to one another;
 an operation detection part which detects operation states to the plurality of operation portions; and
 a control part which displays character information about a character assigned to an operation portion, to which an operation is detected by the operation detection part,
 wherein if it is determined that a first operation portion among the plurality of operation portions is operated based on detection of an operation state by the operation detection part, the control part displays character information about a character assigned to the first operation portion on the display part, and further specifies a second operation portion associated with the first operation portion based on the operation state to the first operation portion, and displays character information about a character assigned to the second operation portion on the display part.

Moreover, the control part may display, as the character information, a character conversion candidate or an expected character entry candidate for a character assigned to the operation portion, on the display part.

In addition, the operation detection part may detect an operation position to the first operation portion as the operation state to the first operation portion, and
 the control part may specify the second operation portion based on the operation position to the first operation portion.

Furthermore, the second operation portion may be an operation portion provided adjacent to the first operation portion.

Furthermore, the operation detection part may detect an operation position to the first operation portion, and
 the control part may specify the second operation portion based on a distance between the operation position to the first operation portion and an operation portion adjacent to the first operation portion.

Furthermore, the operation detection part may detect an operation range to the plurality of operation portions as the operation states to the plurality of operation portions, and the control part may determine an operation to the first operation portion based on the operation range detected by the operation detection part.

Furthermore, the control part may specify the second operation portion based on an operation range to the first operation portion from the operation range detected by the operation detection part.

Furthermore, the control part may display the character information about the character assigned to the first operation portion and the character information about the character assigned to the second operation portion in different modes, on the display part.

Furthermore, if a predetermined condition is met, the control part may specify one of the first operation portion and the second operation portion as a predetermined operation portion and display the character information about the character assigned to the predetermined operation portion on the display part, and the control part may restrict display of the character information about the character assigned to an operation portion, which is other than the predetermined operation portion and included in the first operation portion and the second operation portion, on the display part.

Furthermore, each time an operation to the first operation portion is detected by the operation detection part, the control part may specify the second operation portion, and display the character information about the character assigned to the first operation portion and the character information about the character assigned to the specified second operation portion, on the display part.

Furthermore, if there are a plurality of operation portions, to which an operation is detected by the operation detection part, the control part may display character information about a character assigned to each of the plurality of detected operation portions, on the display part.

Furthermore, if it is detected that an operation to the plurality of operation portions is performed for a time exceeding a predetermined time, the operation detection part may update the detection of the operation states to the plurality of operation portions, and the control part may update the character information displayed on the display part in accordance with the updated operation states.

Furthermore, if there is a record of correction to the character information displayed based on an operation to the first operation portion, the control part may display the character information about the character assigned to the second operation portion, on the display part.

Furthermore, the plurality of operation portions may be provided on a same plane surface.

Furthermore, the display apparatus may include a touch panel having the plurality of operation portions and the display part, and the operation detection part may detect a contact operation to the touch panel.

A display method according to the present invention is in a display apparatus including a display part, a plurality of operation portions, to which different characters are assigned, respectively, and which are provided adjacent to one another, an operation detection part which detects operation states to the plurality of operation portions, and a control part which displays character information about a character assigned to an operation portion, to which an operation is detected by the operation detection part, and includes: if it is determined that a first operation portion among the plurality of operation portions is operated based on detection of an operation state by the operation detection part, displaying character information about a character assigned to the first operation portion and character information about a character assigned to a second operation portion specified in association with the first operation portion, on the display part.

Effect of the Invention

According to the display apparatus and the display method thereof according to the present invention, it is possible to effectively display character information on the display portion.

BRIEF DESCRIPTION OF THE DRAWINGS

FIG. 4 is a view showing an example for assignment of characters to keys (operation portions) in the first embodiment of the present invention.

FIG. 6 illustrates the peripheries of the "5" key.

FIG. 17 is a view showing one example of an entry screen of a portable terminal according to a specific example 1 of the second embodiment of the present invention.

FIG. 20 is a view showing one example of a contact key management table in the specific example 2 of the second embodiment of the present invention.

FIG. 21 is a view showing one example of an entry screen in the specific example 2 of the second embodiment of the present invention.

DESCRIPTION OF EMBODIMENTS

Hereinafter, embodiments of the present invention will be described with reference to the accompanying drawings, wherein a portable terminal will be described as one example of the display apparatus of the present invention.

(First Embodiment)

Figure 1:
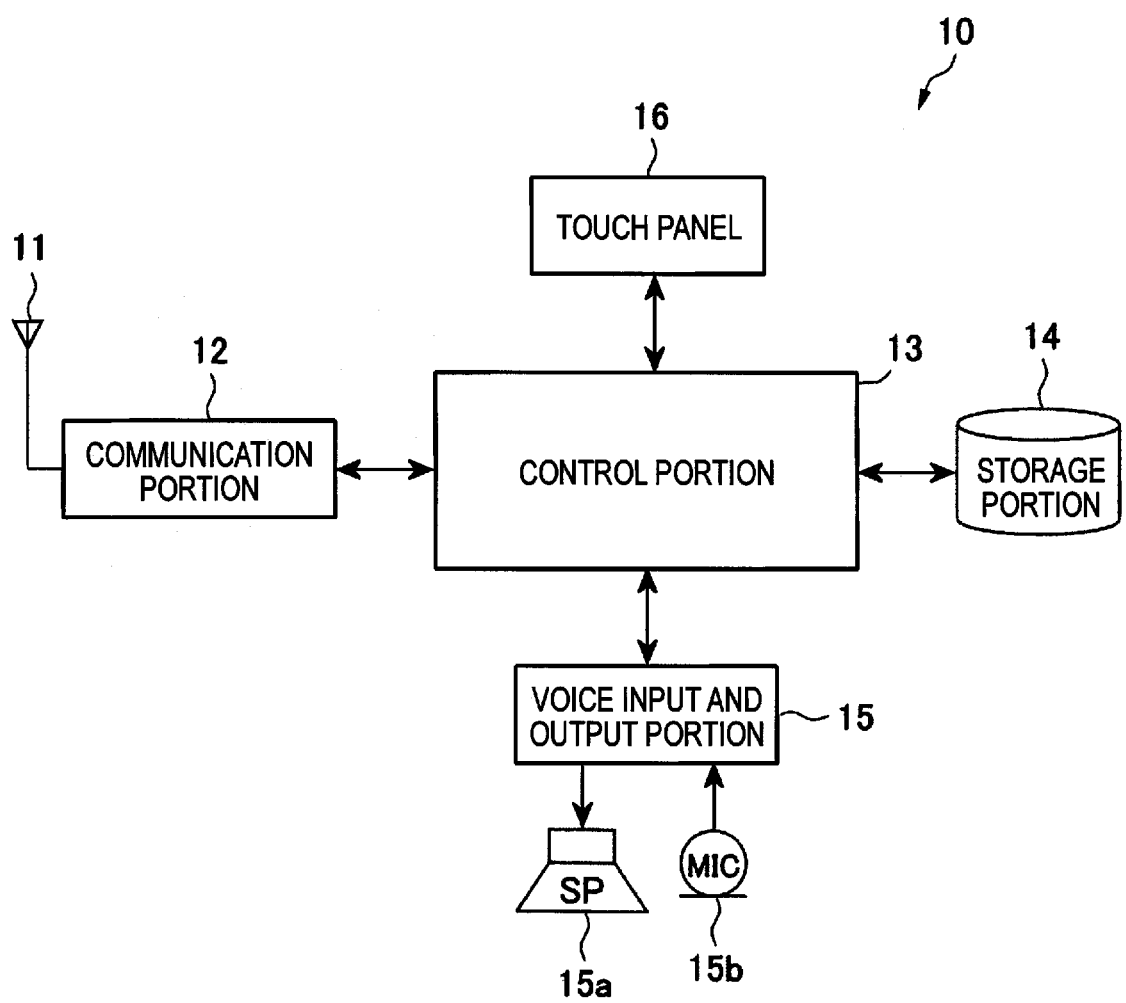
FIG. 1 is a general block diagram showing a configuration example of a portable terminal (display apparatus) according to a first embodiment of the present invention.

FIG. 1 is a general block diagram showing a configuration example of a portable terminal according to a first embodiment of the present invention.

A portable terminal 10, which is the display apparatus illustrated in FIG. 1, includes an antenna 11, a communication portion 12, a control portion 13, a storage portion 14, a voice input and output portion 15, a speaker (SP) 15a, a microphone (MIC) 15b, and a touch panel 16 (operation portions, an operation detection portion, and a display portion).

In this embodiment, the portable terminal 10 is a portable telephone. The portable terminal 10 may be, for example, PHS (Personal Handy phone System). The portable terminal 10 has functions of making a voice call, writing an electronic mail and transmitting and receiving an electronic mail, and reading a WEB (World Wide Web) site, etc. These various functions are performed by application programs under control of the control portion 13.

In this embodiment, the antenna 11 is an internal antenna. The antenna 11 may be, for example, a rod antennal. The antenna 11 transmits electromagnetic waves in a predetermined frequency band toward a base station (not illustrated) or receiving the waves from the base station.

The communication portion 12 modulates a transmission signal output by the control portion 13 by using a predetermined modulation method and transmits the modulated transmission signal as a radio signal to a base station through the antenna 11. The communication portion 12 performs demodulation of the radio signal received from the base station through the antenna 11 in correspondence with the modulation method and outputs the demodulated signal as a receiving signal to the control portion 13.

The control portion 13 is configured by, for example, a micro computer, and DSP, etc. The control portion 13 controls general operations of the portable terminal 10 to enable various processes from a user to be performed in an appropriate sequence.

Processes performed by the control portion 13 include a process for character conversion and a process for display of conversion candidates. In addition to these processes, processes performed by the control portion 13 include application processes for performing making voice calls, e-mailing, or reading of a WEB.

Controls performed by the control portion 13 include, for example, control of communication of the communication portion 12, and control of access to the storage portion 14, control of data display on the touch panel 16, control of character entering by operation of the touch panel 16, and control of voice processing in the voice input and output portion 15, and others.

The storage portion 14 is configured by, for example, a nonvolatile storage device (flash memory) or a random access storage device (SRAM and DRAM), and others.

The storage portion 14 stores a dictionary for displaying character conversion and conversion candidates on the touch panel 16, conversion records, in which records of character conversion are registered, entering records, in which records of entering or deletion of characters are registered, an operating system, and application programs for character entering, etc. In addition, the storage portion 14 stores output results of the control portion 13, temporary data used in program processing, and an address book including telephone numbers, etc.

In order to output digital voice data supplied from the control portion 13 through the speaker 15a, the voice input and output portion 15 performs signal processing such as digital-analogue (D/A) conversion and amplification for the digital voice data.

In order to convert an analogue voice signal input from the microphone 15b into digital voice data and output them to the control portion 13, the voice input and output portion 15 performs processing of the analogue voice signal such as amplification, analogue-digital (A/D) conversion, and coding.

In this embodiment, the touch panel 16 is a resistive film type touch panel, which is pressed by a finger to enter characters. The touch panel 16 may be other types of a touch panel such as an electrostatic capacity type touch panel and an infrared touch panel.

The touch panel 16 has function of an entering device for entering characters and function of a display apparatus for displaying characters or images. The touch panel 16 performs functions of an entering device and a display apparatus based on control of the control portion 13.

Figure 2:
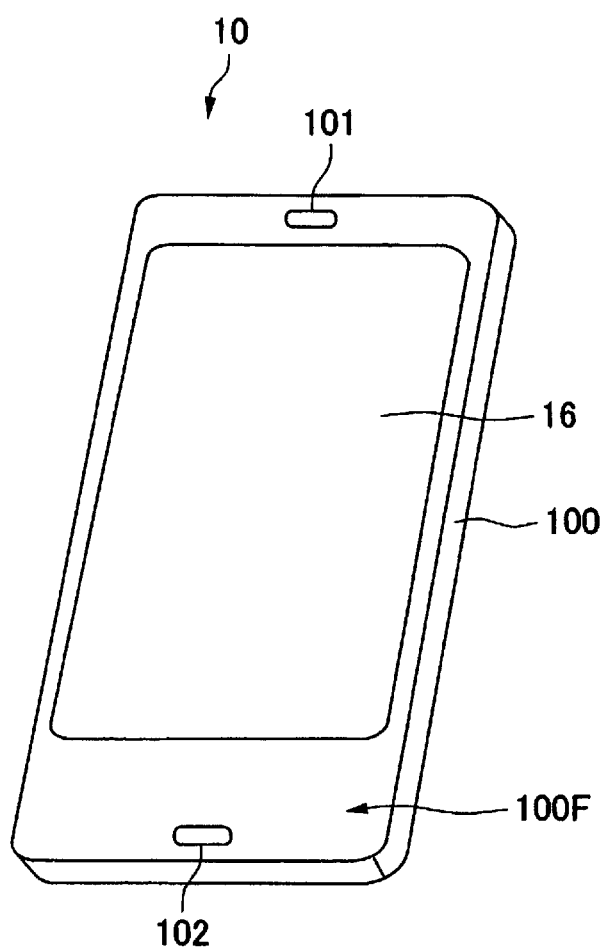
FIG. 2 is a perspective view showing an appearance example of the portable terminal (display apparatus) according to the first embodiment of the present invention.

Each of the elements illustrated in FIG. 1 is contained in a case illustrated in FIG. 2.

FIG. 2 is a perspective view showing an appearance example of the portable terminal according to the first embodiment of the present invention.

As illustrated in FIG. 2, in this embodiment, the portable terminal 10 is a portable terminal, which is called as a straight type portable terminal. A touch panel 16 is mounted on a top surface 100F of a case 100 of the portable terminal 10 such that the touch panel 16 can be pressed by a finger. The portable terminal 10 may be a foldable type portable terminal, in which two cases can be folded by a hinge. If the portable terminal 10 is a foldable type portable terminal, the touch panel 16 is mounted on one of the two cases.

A hole 101 for the speaker 15a is formed on the upper portion of the touch panel 16. The speaker 15a is disposed near the hole 101 in the inside of the case 100. A hole 102 for the microphone 15b is formed on the lower portion of the touch panel 16. The microphone 15b is disposed near the hole 102 in the inside of the case 100. A power button, not illustrated, is disposed on the top surface 100F or the side surface of the case 100.

The portable terminal 10 has character conversion function of converting characters into other characters such as Kanji. The character conversion is performed in accordance with a character conversion mode, which will be described later.

Operation of the touch panel 16 is performed by slightly pressing keys displayed on the touch panel 16 by means of a finger. If the touch panel 16 is capable of detecting entering, the pressing may be contact (touch by slightly pressing). Instead of a finger, a pen (touch pen) may be used to enter characters. The touch panel 16 is configured to be capable of detecting the pressing or the contact.

Since the touch panel 16 is operated by slightly pressing the touch panel 16 by means of a finger, sensitive operation is possible. Since operation detection areas of the touch panel 16 are formed on the same plane surface, even if each of the operation detection areas is segmented into a plurality of areas (a plurality of operation portions), the respective areas are necessarily disposed on the same plane surface.

Accordingly, if different characters are assigned to the plurality of areas, and characters are entered by operation of the plurality of areas, the operation is detected over the plurality of areas disposed on the same plane surface, so that entering a wrong character may occur. The portable terminal 10 is characterized by presenting conversion candidates for a character while considering the character entering error.

Hereinafter, the touch panel 16, and the character conversion function using the touch panel 16 will be described. In the descriptions, characters mean Hiragana, Katakana, English characters (alphabets), Kanji, numerals, symbols, and others.

Hiragana, Katakana, English characters, and numerals include 1 bite characters and 2 bite characters. In the Unicode, a half size of a character is a 2 bite character. The character conversion includes conversion from Hiragana into Kanji and other various conversions such as conversion from Hiragana into Katakana and conversion from Hiragana into English characters.

Figure 3:
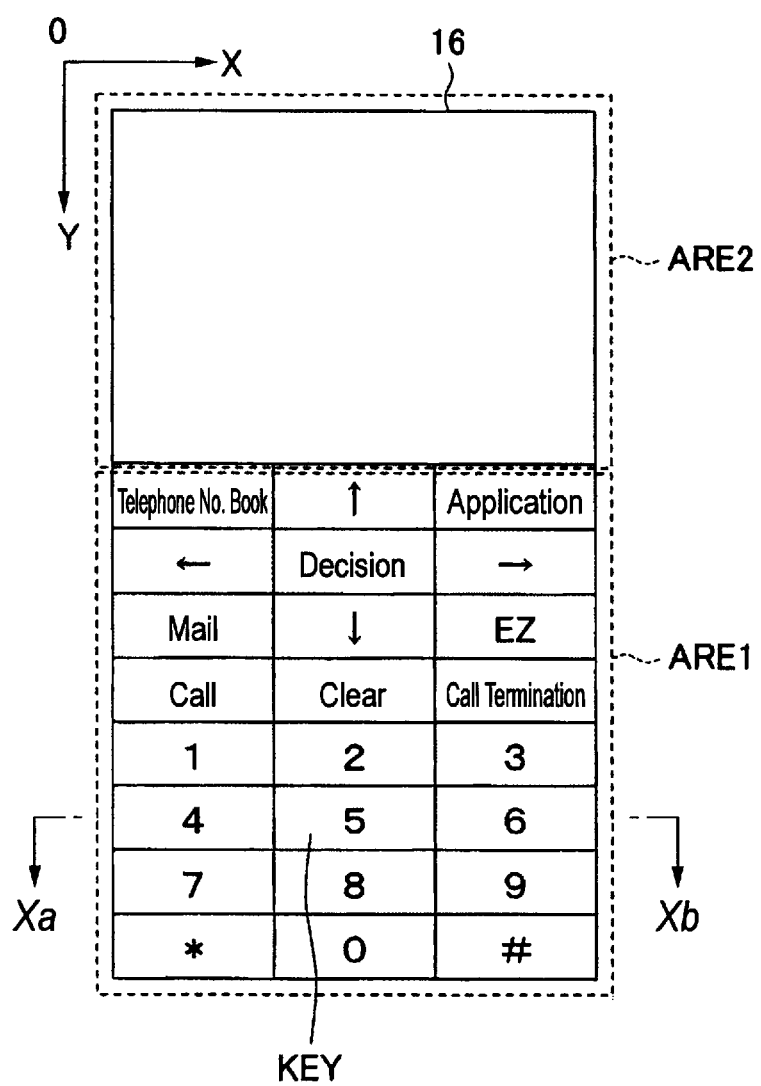
FIG. 3 is a schematic view showing details of a touch panel of the portable terminal (display apparatus) illustrated in FIG. 2.

FIG. 3 is a perspective view showing details of the touch panel illustrated in FIG. 2.

As illustrated in FIG. 3, the touch panel 16 is configured by an operation area ARE1 and a display area ARE2. The touch panel of the display area ARE2 functions as a display apparatus and corresponds to the display portion of the present invention.

The operation area ARE1 is assigned with various functions, such as a call key, a decision key, direction keys, numeral keys, and segmented into a plurality of operation portions disposed adjacent to one another. On each of the segmented operation portions, information showing its assigned function and character is displayed. The operation area ARE1 is segmented into 3 (X axis direction)×8 (Y axis direction) operation portions. For example, "4," "5," and "6" keys are assigned in the X axis direction to the respective operation portions between Xa and Xb represented by broken lines in FIG. 3, and the assigned characters are displayed thereon. The display area ARE2 is an area for displaying characters entered by pressing the keys of the operation area ARE1, expected character conversion candidates, characters after character conversion, various images, and others.

FIG. 3 shows the case where the area of the operation area ARE1 and the area of the display area ARE2, which are occupied on the touch panel 16, are substantially the same. The entire area of the touch panel 16 may be occupied by the operation area ARE1 or the display area ARE2. Of course, it is possible to set a ratio of the area of the operation area ARE1 to the area of the display area ARE2, which are occupied on the touch panel 16.

FIG. 4 is a view showing one example for assignment of characters to keys (operation portions) in the embodiments of the present invention.

For example, assignment of characters to the "5" key will be described. In a "Kanji Hiragara mode," 'な (na)," "に (ni)," "ぬ (nu)," "ね (ne),"and "の (no)" are assigned to the "5" key. In a "Katakana mode," "ナ (na),""ニ (ni)," "ヌ (nu)," "ネ (ne)," and "ノ (no)" are assigned to the "5" key. In an "English character mode," "j," "k," "l," "J," "K," and "L" are assigned to the "5" key. In a "numeral mode," "5" is assigned to the "5" key. These modes are selected by a user.

Figure 5:
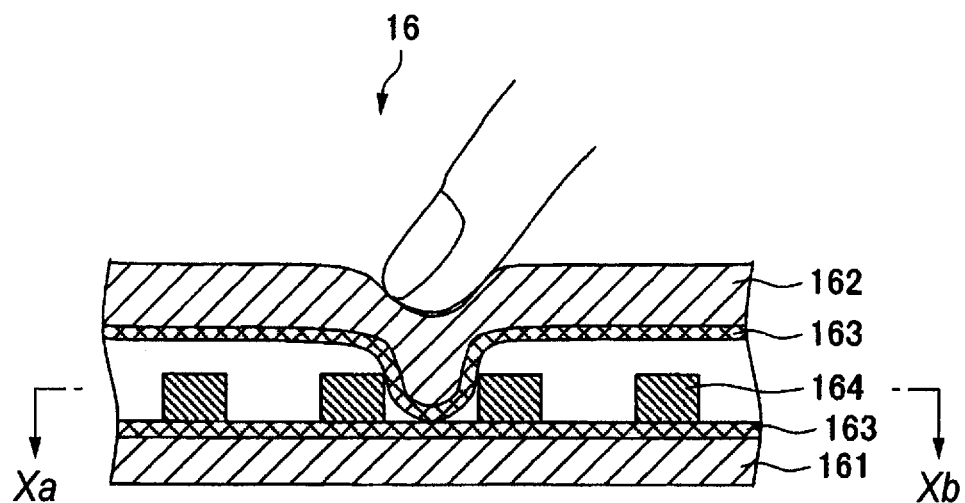
FIG. 5 is a cross-sectional schematic view between the Xa and Xb broken lines of FIG. 3 to explain a structure of a touch panel and a method of detection of operation in the portable terminal (display apparatus) illustrated in FIG. 2.

FIG. 5 is a cross-sectional schematic view between Xa and Xb represented by broken lines in FIG. 3 to explain a structure of the touch panel illustrated in FIG. 2 and a method of detection of operation. FIG. 5 illustrates the simplest structure of the touch panel as an entering device and does not illustrate a color filter, a liquid crystal, and others.

As illustrated in FIG. 5, in the touch panel 16, a glass substrate 161 and a film 162 are facing to each other. ITO (Indium Tin Oxide) 163 is formed on the surface of the glass substrate 161, which is facing to the film 162. ITO 163 is also formed on the surface of the film 162, which is facing to the glass substrate 161. In order to prevent erroneous contact and others, a plurality of spacers 164 are disposed between the glass substrate 161 and the film 162. Due to this structure, the touch panel 16 also functions as an operation detection portion for detecting an operation state of each of the operation portions (each key).

FIG. 5 illustrates the state that a part of the film 162 is pressed by a finger. In this case, the ITO 163 of the glass substrate 161 and the ITO 163 of the film 162 become in contact with each other at the pressed point. The touch panel 16 detects an X coordinate and a Y coordinate of the pressed point as set forth below.

When detecting an X coordinate of the pressed point, voltage is applied in the X axis direction of the ITO 163 of the film 162, so that the ITO 163 of the film 162 and the ITO 163 of the glass substrate 161 become conductive at the pressed point. In this case, voltage gradients are generated on the ITO 163 of the film 162 in the X axis direction. The touch panel 16 calculates divided voltage from the voltage of the pressed point that has been detected on the glass substrate 161 to detect an X coordinate of the pressed point.

When detecting a Y coordinate of the press point, contrary to the detection of the X coordinate, voltage is applied in the Y axis direction of the ITO 163 of the glass substrate 161. In this case, voltage gradients are generated in the Y axis direction of the ITO 163 of the glass substrate 161. The touch panel 16 calculates divided voltage from the voltage of the pressed point that has been detected on the film 162 to detect a Y coordinate of the pressed point.

Figure 6:
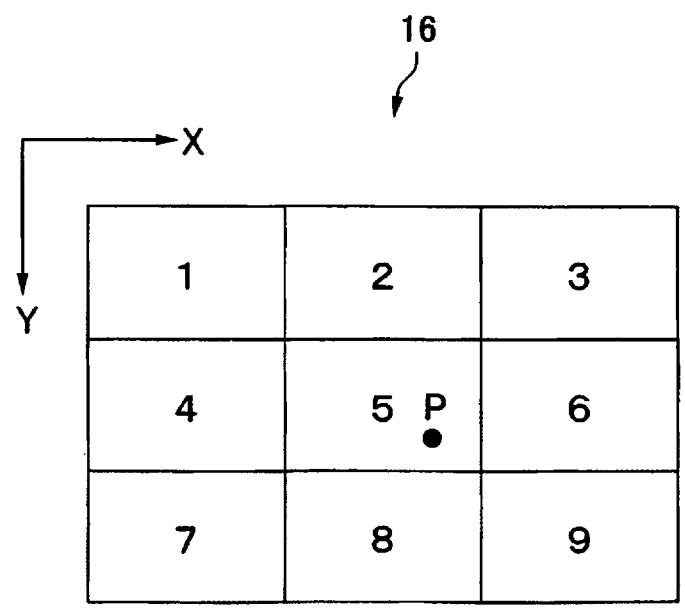
FIG. 6 is a schematic view showing a part of the touch panel of FIG. 3.

FIG. 6 is a schematic view showing a part of the touch panel illustrated in FIG. 3. FIG. 6 only illustrates the peripheries of the "5" key.

As illustrated in FIG. 6, "1" to "9" keys are displayed on the respective areas of the touch panel 16. Hereinafter, based on the area KEY, on which "5" is displayed, a method of displaying conversion candidates, which is performed by the control portion 13 in the case where 'な (na)" is entered, will be described.

In order to enter 'な (na)," a user selects the "Kanji Hiragana mode" and presses the area of the touch panel 16, on which the "5" key is displayed. In this case, the touch panel 16 detects an X coordinate and a Y coordinate of the pressed point P.

The touch panel 16 outputs the detected coordinates of the pressed point P to the control portion 13.

Figure 7:
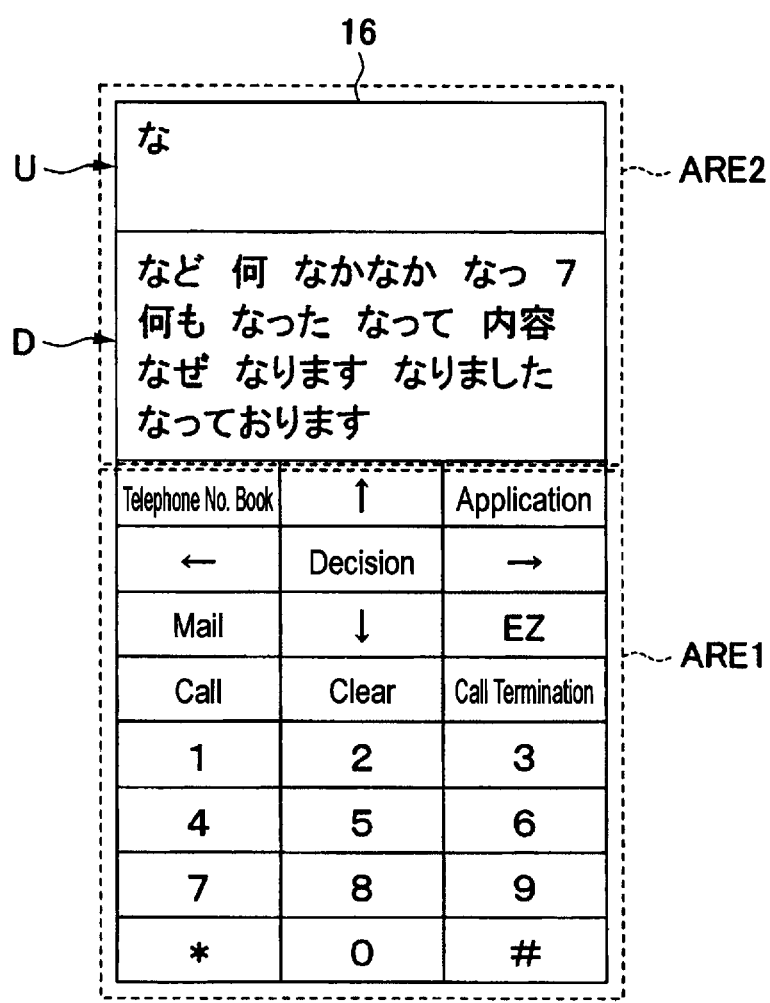
FIG. 7 is a view showing a display example of the touch panel in the first embodiment of the present invention.

The control portion 13 determines that among the "1" to "9" keys, the key corresponding to the coordinates of the pressed point P has been operated as the first operation portion. And, based on the detected coordinates of the pressed point P, the control portion 13 determines that 'な (na)" assigned to the "5" key has been entered. By referencing to the dictionary and others of the storage portion 14, the control portion 13 displays the entered character 'な (na)" and conversion candidates expected from 'な (na)" on the display area ARE2 of the touch panel 16. FIG. 7 illustrates an example for the display.

In other words, the control portion 13 determines from detection of an operation state of the touch panel 16 that among the plurality of operation portions, the first operation portion has been operated, and displays conversion candidates for the character assigned to the first operation portion.

Conversion candidates means, for example, character conversion candidates (for example, "など (nado: etc.)" and "なに (nani: what)") expected from an entered character (for example, 'な (na)").

In addition to character conversion candidates, expected character entry candidates may be displayed. Expected character entry candidates mean, for example, entry candidates displayed by expecting entry characters in the alphabet entering mode or others (for example, if "dat" has been entered, "data," "database," "date" and others are displayed). In addition to conversion candidates and expected character entry candidates, other character information may be displayed.

FIG. 7 is a view showing a display example of the touch panel 16 in the first embodiment of the present invention.

As illustrated in FIG. 7, when entering characters, the display area ARE2 of the touch panel 16 is divided into an upper portion U and a lower portion D. The lower portion D of the display area ARE2 displays conversion candidates such as "など (nado: etc.)," "なに (nani: what)," and 'なかなか (nakanaka: soso)." The displaying order of conversion candidates is determined in accordance with the dictionary stored in the storage portion 14, conversion records, and others.

The upper portion U of the display area ARE2 displays the entered character 'な (na)." An entered character is decided by pressing the decision key after entering, for example, 'な (na)."

However, the position of the pressed point P does not necessarily exist around the center of the area. As illustrated in FIG. 6, there is a case where the pressed point P exists around a right lower portion of the pressed area. In this case, there is a possibility that the user would have attempted to press the "8" or "6" key adjacent to the "5" key, rather than the "5" key.

Accordingly, the control portion 13 additionally divides the area of the "5" key into four areas, and displays conversion candidates on the display area ARE2 in accordance with a divided area, in which the pressed point P exists.

Figure 8:
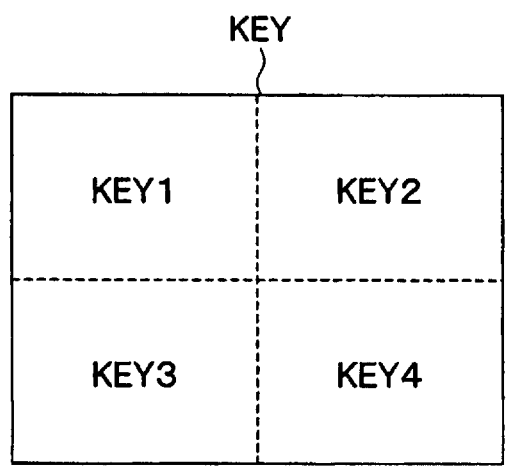
FIG. 8 is a view to explain specifying, based on an operation state of a certain key (first operation portion), another key (second operation portion), and displaying conversion candidates for a character of the key, in the portable terminal (display apparatus) according to the first embodiment of the present invention.

FIG. 8 is a view to explain specifying, based on an operation state of a certain key (first operation portion), another key (second operation portion), and displaying conversion candidates for a character of the key, in the portable terminal according to the embodiment of the present invention.

As illustrated in FIG. 8, the divided areas of the operation area ARE1 are four uniformly divided areas. The four divided areas are referred to as KEY1 to KEY4, respectively. Hereinafter, the case where the pressed point P illustrated in FIG. 6 exists in KEY4 will be described.

Based on the coordinates of the pressed point P that have been output from the touch panel 16, the control portion 13 detects a divided area, in which the pressed point P exists, from KEY1 to KEY4. If it is detected that the pressed point P exists in the divided area KEY4, based on information of the detected position, the control portion 13 determines that the possibility that the user would have attempted to press the "5" key is 70%, and the possibilities that the user would have attempted to press the "8" key and the "6" key adjacent to the divided area KEY4 are 20% and 10%, respectively.

Based on information (operation state) of the divided area, in which the pressed point P exists, the control portion 13 specifies areas assigned to keys having the possibility that the user would have attempted to press, other than the "5" key. In this case, the areas specified by the control portion 13 are the areas of the "6" key and the "8" key. In other words, the operation position of the first operation portion (the "5" key) is detected, and based on the operation position, second operation portions ("6" key and "8" key) are specified.

In accordance with the possibility that the user would have attempted to press, the control portion 13 displays conversion candidates on the display area ARE2. Specifically, the control portion 13 displays conversion candidates for 'な (na)" of the "5" key, "や (ya)" of the "8" key, and "は (ha)" of the "6" key on the display area ARE2 of the touch panel 16.

Figure 9:
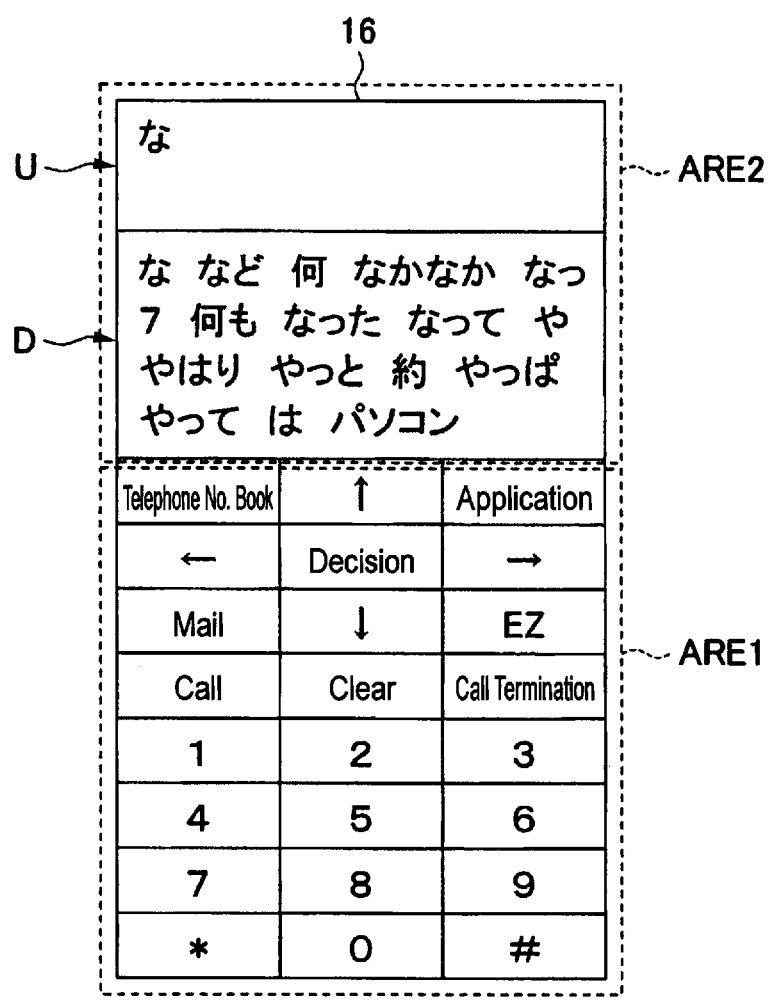
FIG. 9 is a view to explain control of display of conversion candidates based on operation states in the portable terminal (display apparatus) according to the first embodiment of the present invention.

For example, in accordance with the possibility that the user would have attempted to press, the control portion 13 displays "など (nado: etc.)" expected from 'な (na)," "やはり (yahari: after all)" expected from "や (ya)," "パソコン (pasokon: personal computer)"expected from "は (ha)" and others on the display area ARE2 of the touch panel 16. FIG. 9 shows an example for the display.

FIG. 9 is a view to explain control of display of conversion candidates based on an operation state in the portable terminal according to the first embodiment of the present invention.

As illustrated in FIG. 9, the lower portion D of the display area ARE2 displays conversion candidates such as 'な (na)," "など (nado: etc.)," . . . "や (ya)," "やはり (yahari: after all),". . . "は (ha)," and "パソコン (pasokon: personal computer)."

Conversion candidates are displayed in the order of high possibility that the user would have attempted to press. Specifically, conversion candidates are displayed in the order of 'な na)" of the "5" key having the highest possibility that the user would have attempted to press, and a word expected from "な (na)," "や (ya)"of the "8" key having the secondly high possibility that the user would have attempted to press, and a word expected from "や (ya)," and finally "は (ha)" of the "6" key, and a word expected from "は (ha)." Meanwhile, a word means a group of characters like "など (nado: etc.)."

The number of conversion candidates to be displayed may vary depending on the possibility that the user would have attempted to press. The possibility that the user would have attempted to press the "5" key is highest, and the possibility that the user would have attempted to press the "6" key is lowest. Thus, in order to quickly decide entered characters, the number of expected conversion candidates to be displayed for "は (ha)" of the "6" key is preferably smaller than the number of words expected from 'な (na)" of the "5" key.

The case where the pressed point P exists on a boundary of two area KEYs will be described. For example, if the pressed point P exists on a boundary between an area KEY of the "5" key and an area KEY of the "6" key, the control portion 13 determines that the possibilities that the user would have attempted to press the "5" key and the "6" key are 50% and 50%, respectively.

Even in the case where the pressed point P exists in other divided areas, the control portion 13 displays conversion candidates on the display area ARE2 of the touch panel 16 in the same manner as described above. For example, if the pressed point P exists in the divided area KEY1, the control portion 13 determines that the possibility that the user would have attempted to press the "5" key is 70%, and the possibilities that the user would have attempted to press the "2" and "4" keys adjacent to the divided area KEY1 are 20% and 10%, respectively.

The possibility that the user would attempted to press depending on the divided areas KEY1 to KEY4 can be set. For example, if the pressed point P exists in the divided area KEY4, the control portion 13 can determine that the possibility that the user would have attempted to press the "5" key is 60%, and the possibilities that the user would have attempted to press the "8," "6," and "9" keys are 20%, 5%, and 5%, respectively.

The control portion 13 specifies the second operation portion based on the operation position of the first operation portion and displays conversion candidates for a character assigned to the first operation portion and conversion candidates for a character assigned to the specified second operation portion on the display area ARE2.

Figure 10:
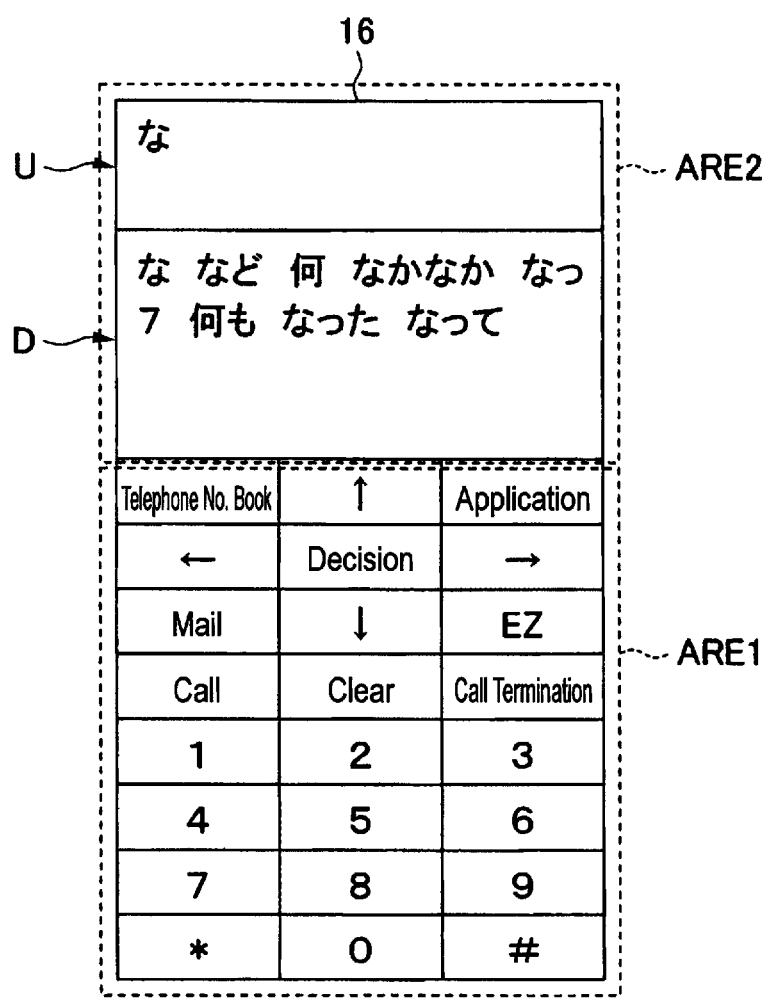
FIG. 10 is a view to explain a scope narrowing process for conversion candidates in the portable terminal (display apparatus) according to the first embodiment of the present invention.

FIG. 10 is a view to explain a scope narrowing process for conversion candidates in the portable terminal according to the first embodiment of the present invention.

Once conversion candidates are displayed on the display area ARE2, in order to quickly decide a desired character or word from the plurality of displayed conversion candidates, the control portion 13 can perform a scope narrowing process.

Specifically, if a user touches 'な (na)" displayed on the lower portion D of the display area ARE2, the control portion 13 displays an inducing message reading "Narrow the scope to 'な (na)'?" on the lower portion D of the display area ARE2. If the user presses the decision key in response to the inducing message, as illustrated in FIG. 10, the upper portion U of the display area ARE2 only displays 'な (na)" and words related to 'な (na),"and the other conversion candidates are erased (restricted).

Among the plurality of displayed conversion candidates, conversion candidates related to a character assigned to a certain key are left, and the other conversion candidates are erased, so that the user can effectively obtain desired conversion candidates.

Here, displaying an inducing message on the lower portion D of the display area ARE2 is adopted as means for narrowing the scope. However, for example, the display of a "telephone number book" key or an "application" key may be changed to the display of "Narrow the scope to 'な (na)'?"

An operation example of the portable terminal 10 will be described. In the descriptions below, it is assumed that the user has pressed the "5" key.

Figure 11:
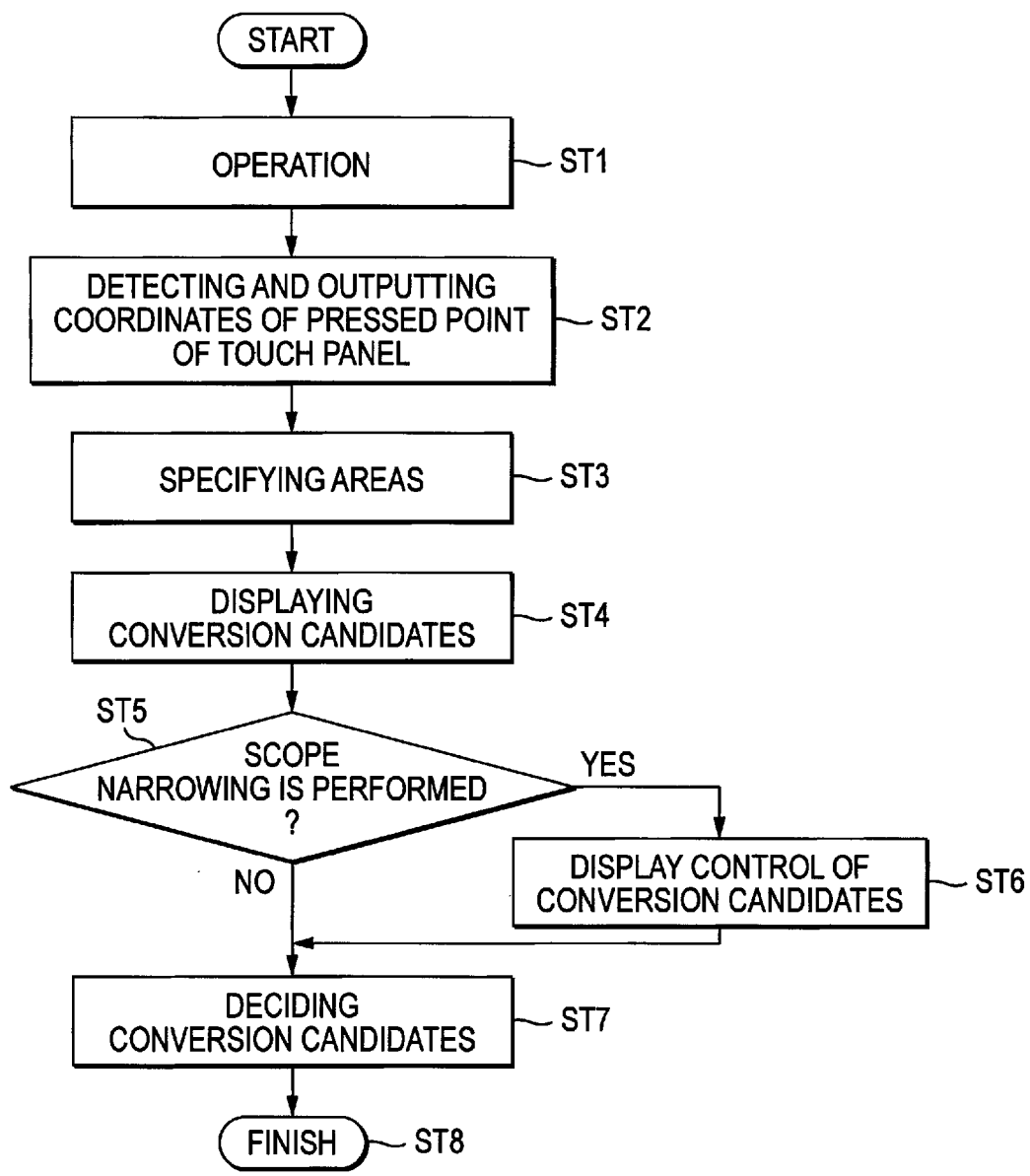
FIG. 11 is a flowchart showing an operation example of the portable terminal (display apparatus) according to the first embodiment of the present invention.

FIG. 11 is a flowchart showing an operation example of the portable terminal according to the first embodiment of the present invention.

As illustrated in FIG. 11, once entering characters is started (ST1), the user operates the operation area ARE1 of the touch panel 16, and presses a key to which a character to be entered is assigned.

The touch panel 16 detects an X coordinate and a Y coordinate of the pressed point P, and outputs the detected coordinates of the pressed point P to the control portion 13 (ST2).

Subsequently, based on the coordinates of the pressed point P that have been output from the touch panel 16, the control portion 13 detects which area has been pressed. Based on the divided area, in which the pressed point P exists, the control portion 13 specifies keys having the possibility that the user would have attempted to press (ST3).

In this case, the areas specified by the control portion 13 are the areas of the "6" and "8" keys.

Depending on the possibility that the user would have attempted to press, the control portion 13 displays conversion candidates for characters of the pressed key and the specified keys on the display area ARE2 (ST4).

Once conversion candidates for the characters assigned to the pressed key and the specified keys are displayed on the display area ARE1, the control portion 13 determines whether a scope narrowing process for selecting a character of one of the pressed key and the specified keys has been performed (ST5).

If the scope narrowing process has been performed in ST5, so that one key has been selected (Yes), the control portion 13 displays conversion candidates for the character assigned to the key on the display area ARE2 and erases conversion candidates for the characters assigned to the other keys from the display area ARE2. In other words, the control portion 13 performs display control of conversion candidates displayed on the display area ARE2 (ST6).

If it is determined that the scope narrowing process has not been performed in ST5 (No), the control portion 13 does not perform the display control of conversion candidates and proceeds with ST7. In ST7, it is determined whether one of the conversion candidates displayed by the control portion 13 has been selected and decided. If it is determined that one conversion candidate has been selected and decided in accordance with operation to the touch panel 16, the conversion candidate is decided, and the process is finished (ST8).

As described above, according to the portable terminal 10, based on an operation state of the pressed key (first operation portion), the control portion 13 specifies another key (second operation portion). In this case, the control portion 13 displays conversion candidates for the character assigned to the pressed key (first operation portion) and conversion candidates for the character assigned to the specified key (second operation portion) on the display area ARE2 of the touch panel 16. Based on the operation state of the pressed key, the control portion 13 restricts display modes of the conversion candidates. In this case, the operation portion specified by the control portion 13 may not be an operation portion adjacent to the first operation portion.

As a result, it is possible to effectively convert an entered character into a desired character. Especially, since keys (operation portions) of the touch panel 16 are disposed on the same plane surface, it is difficult to discriminate a certain key from other keys, so that erroneous key pressing easily occurs. However, according to the portable terminal 10, even in the case of using the touch panel 16, in which a plurality of operation portions are disposed on the same plane surface, it is possible to effectively convert an entered character into a desired character without deteriorating the operability.

The portable terminal 10 performs the scope narrowing process to reduce unnecessary conversion candidates, which are not desired by a user, so that a desired character can be quickly decided.

(Modified Example 1)

According to a modified example 1, in ST3 illustrated in FIG. 11, when the control portion 13 specifies other keys (second operation portion), the scope of keys having a high possibility that the user would have attempted to press is narrowed depending on distances between the pressed point of the pressed key (first operation portion) and central points of other keys (second operation portion) adjacent to the pressed key (first operation portion).

Figure 12:
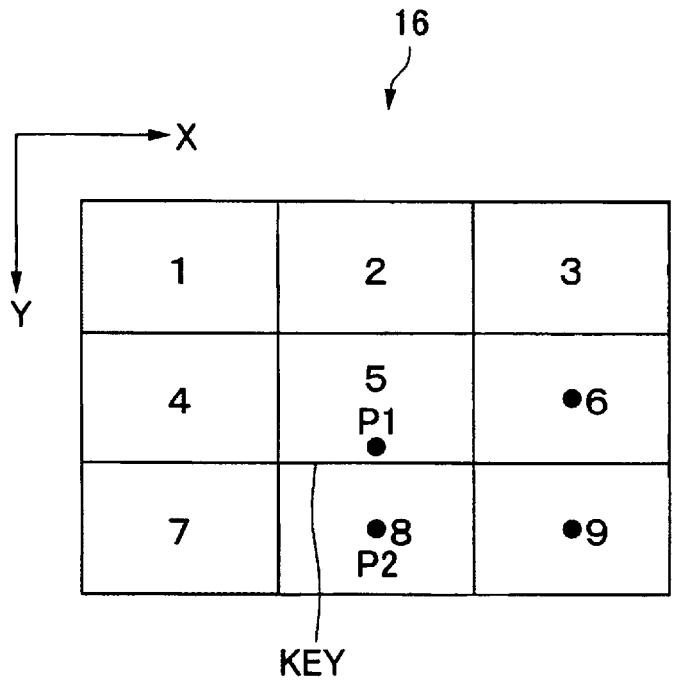
FIG. 12 is a schematic view showing a part of a touch panel according to a modified example of the first embodiment of the present invention.

FIG. 12 is a schematic view showing a part of a touch panel according to a modified example of the first embodiment of the present invention. FIG. 12 only illustrates the peripheries of the "5" key.

Hereinafter, based on the area KEY, on which the "5" key is displayed, the simplest example will be described.

It is assumed that the pressed point is the pressed point P1 on the central lower portion of the "5" key illustrated in FIG. 12. The control portion 13 calculates distances between coordinates of the pressed point P1 and coordinates of a central point of each of the keys adjacent to the "5" key. In this case, among the calculated distances between the pressed point P1 and central points of other keys, the distance between the pressed point P1 and the central point P2 of the "8" key is shortest.

Accordingly, the control portion 13 displays conversion candidates for the characters assigned to the "5" and "8" keys on the display area ARE2.

As a result, an entered character can be more effectively converted into a desired character.

(Modified Example 2)

According to a modified example 2, in ST3 illustrated in FIG. 11, when the control portion 13 specifies other keys (second operation portion) adjacent to the pressed key (first operation key), the control portion 13 specifies other keys (second operation portion) adjacent to the pressed key (first operation portion) from a pressed region of the pressed key (first operation portion).

Figure 13:
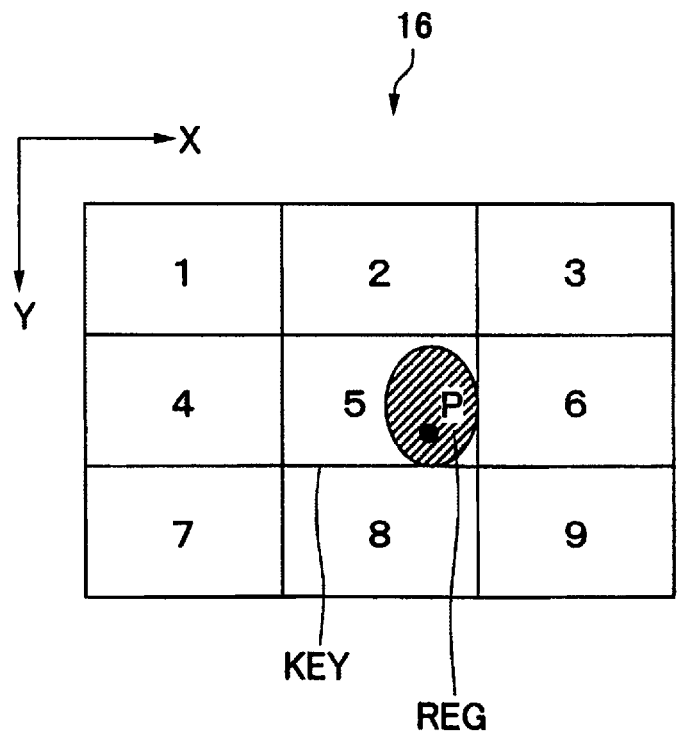
FIG. 13 is a schematic view showing a part of a touch panel according to a modified example of the first embodiment of the present invention.

FIG. 13 is a schematic view showing a part of a touch panel according to a modified example of the first embodiment of the present invention. FIG. 13 only illustrates the peripheries of the "5" key.

Hereinafter, based on the area KEY, on which the "5" key is displayed, the simplest example will be described.

As illustrated in FIG. 13, in case of pressing by a finger, the pressed portion has a somewhat large area. Thus, the control portion 13 detects a pressed region REG, in addition to the pressed point P.

In this case, the pressed region REG ranges over the divided areas KEY 2 and KEY 4 in FIG. 8. Based on information (operation state) of the divided areas over which the pressed region REG ranges, the control portion 13 specifies other keys, and determines that the "5" key would have been pressed with the possibility of 70%, and that the "6" and "8" keys would have been pressed with the possibilities of 15% and 15%, respectively. The control portion 13 displays conversion candidates for the characters assigned to the "5," "6," and "8" keys on the display area ARE2 of the touch panel 16.

As a result, even in the case of pressing by a finger, an entered character can be effectively converted into a desired character.

(Modified Example 3)

According to a modified example 3, in ST4 illustrated in FIG. 11, when the control portion 13 displays conversion candidates on the display area ARE2 of the touch panel 13, the sizes of the characters of the conversion candidates are discriminated depending on the possibility that the user would have attempted to press. In other words, the modified example 3 discriminates display modes of character information.

The control portion 13 displays a character of a conversion candidate having the highest possibility that the user would have attempted to press in a larger size than a character of a conversion candidate having the lowest possibility that the user would have attempted to press. For example, in case of the example illustrated in FIG. 9, the control portion 13 displays 'な (na)" and words expected from 'な (na)" in larger sizes than "や (ya)" and words expected from "や (ya)" on the display area ARE2.

As a result, an entered character can be converted into a desired character with good visual efficiency.

According to another modified example, the control portion 13 may display conversion candidates on the display area ARE2 of the touch panel 16 depending on key operation time (operation state).

In ST4 illustrated in FIG. 11, when a predetermined time (for example, 3 seconds) elapses after conversion candidates are displayed on the display area ARE2 of the touch panel 16, the control portion 13 displays only the conversion candidate having the highest possibility that the user would have attempted to press on the display area ARE2.

As a result, an entered character can be effectively converted into a desired character.

According to another modified example, if there is a record of correction to character information displayed based on operation of a pressed key (first operation portion), the control portion 13 may display character information about a character assigned to another key (second operation portion) on the display portion. For example, in the case where the "5" key has been pressed, if there is an entering record (correction record) of correcting the "5" key to another key (e.g., the "6" key) and entering it by operating a backspace key, a delete key, or other keys with reference to entering records stored in the storage portion 14, the control portion 13 adds the entering record to conversion candidates of the "5" key and displays them on the display area ARE2 for conversion candidates of the another key (e.g., the "6" key). For example, the control portion 13 only references to previous records when the "5" key has been pressed or determines whether the number or frequency of times for correcting the "5" key to another key (e.g., the "6" key) is more than the predetermine number of times, such that the control portion 13 controls display of conversion candidates for the another key (e.g., the "6" key).

Figure 14:
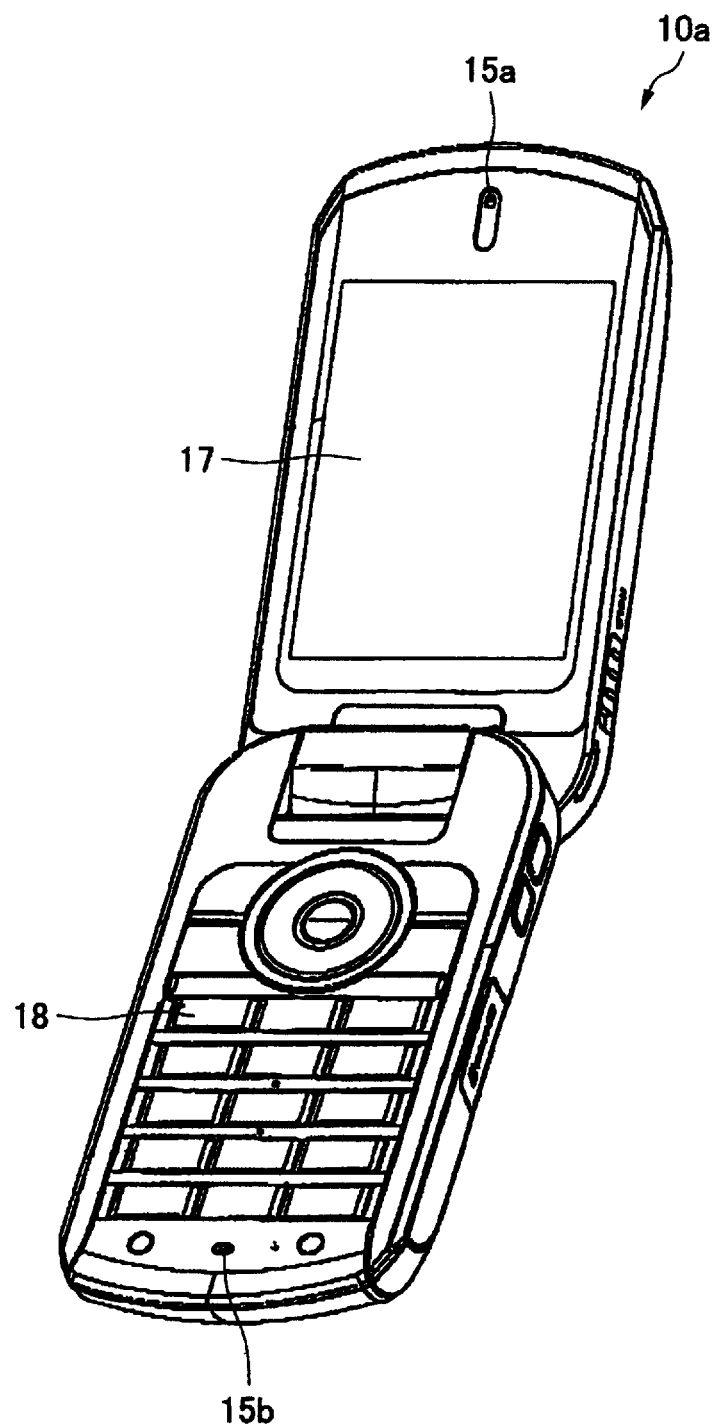
FIG. 14 is a perspective view showing an appearance example of a portable terminal (display apparatus) according to a modified example of the first embodiment of the present invention.

According to another modified example, the display apparatus of the present invention may be applied to the portable terminal 10a illustrated in FIG. 14. FIG. 14 illustrates a foldable type portable terminal 10a. The portable terminal 10a includes a display portion 17, and a plurality of keys 17, which are an operation portion and an operation detection portion. Even in case of the portable terminal including keys, and not the keys on the touch penal, it is possible to effectively convert an entered character into a desired character.

According to the embodiments of the present invention, in ST1 to ST8 of FIG. 11, if operation to the touch panel 16 has been performed, conversion candidates for a character assigned to the area, to which the operation has been performed, and conversion candidates for characters assigned to other areas, which are specified based on the operation state, are displayed on the display area ARE2, and one of the conversion candidates is decided by operation of the decision key. However, the present invention is not limited thereto. If another operation has been subsequently performed before one of the conversion candidates is decided by operation of the decision key, the operation can also be subject to the processes in ST1 to ST8.

In this case, conversion candidates for a character assigned to the area, to which the another operation has been performed, and conversion candidates for a character assigned to other areas, which are specified based on the operation state of the another operation, are displayed on the display area ARE2.

According to the embodiments of the present invention, the processes in ST1 to ST8 can be applied each time operation is detected by the touch panel 16. As a result, conversion candidates in consideration of erroneous key pressing can be displayed on the display area ARE2 each time a character is entered so that a user can enter characters without anxiety.

Meanwhile, if subsequent characters have been entered before a conversion candidate for an entered character is decided, displaying conversion candidates only in consideration of erroneous pressing of the lastly entered character may be performed, and displaying conversion candidates in consideration of erroneous pressing of the characters prior to the lastly entered character may not be performed. As a result, it is possible to display conversion candidates in consideration of erroneous pressing, and restrict unnecessary conversion candidates to be displayed on the display area ARE2, so that visibility of conversion candidates is improved.

(Second Embodiment)

Next, a second embodiment of the present invention will be described.

Figure 15:
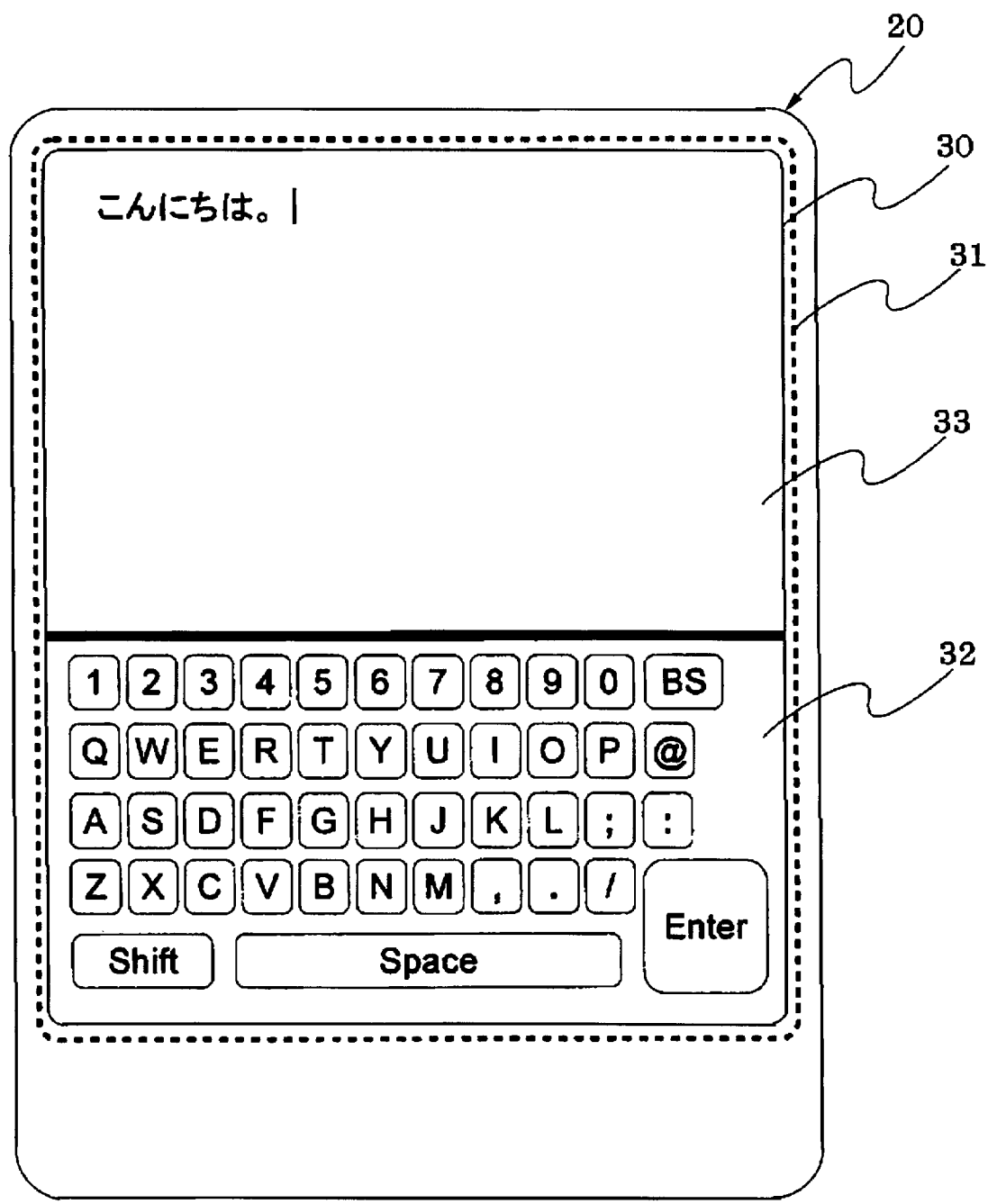
FIG. 15 is an appearance view showing one example of a portable terminal (display apparatus) according to a second embodiment of the present invention.

FIG. 15 is an appearance view showing configuration of a portable terminal according to a second embodiment of the present invention.

A portable terminal 20 includes a display apparatus 30 such as a liquid crystal display, and a touch panel 31 disposed on the front surface of the display apparatus 30. The display area of the display apparatus 30 is divided into an operation key display portion 32 for displaying operation keys (operation portions) and a display portion 33 for displaying various information in accordance with entering by a user. The operation key display portion 32 and the display portion 33 may be configured by separate display apparatuses. The touch panel 31 does not need to be disposed overlapping with the entire surface of the display apparatus 30, and is preferably disposed overlapping with at least the operation key display portion 32.

In the touch panel 31, in correspondence with an image of each of the operation keys displayed on the operation key display portion 32, an entry reception range (a range, in which entry by a user is received as entry to the operation key) for each of the operation keys is set. If contact by a finger, etc., is detected, the contact range is received as entry operation to the operation key included in the entry reception range.

Figure 16:
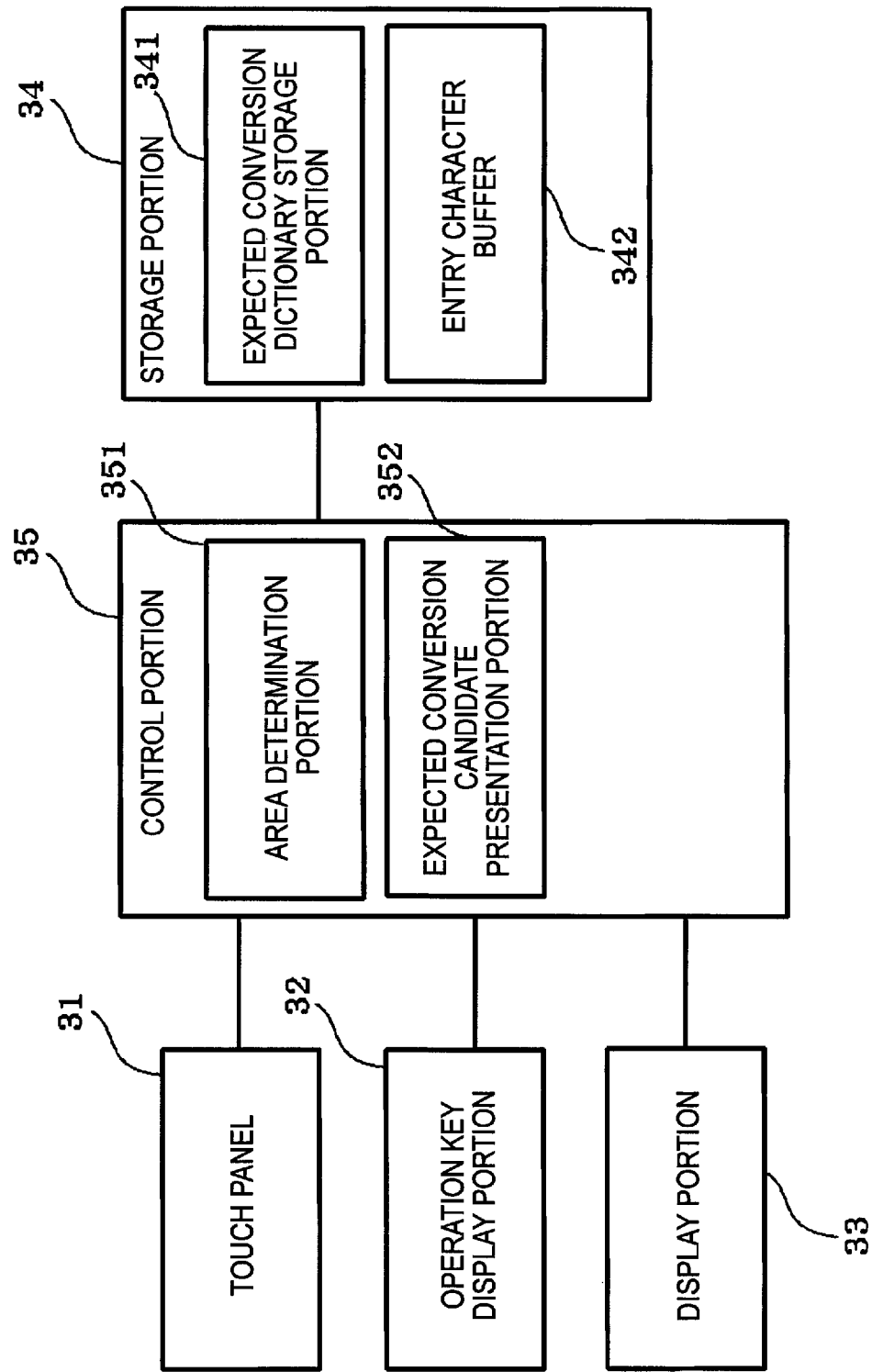
FIG. 16 is a functional block diagram for the portable terminal (display apparatus) according to the second embodiment of the present invention.

FIG. 16 is a functional block diagram of the portable terminal 20 of the embodiments of the present invention. In addition to the operation key display portion 32, the display portion 33, and the touch panel 31 that have been described, the portable terminal 20 includes a storage portion 34 for storing various information such as Japanese entry application, Kanji conversion candidates for Kana-Kanji conversion, and various settings, and a control portion 35 for controlling each of the functional blocks and the portable terminal 20 as a whole.

Hereinafter, in order to mainly describe portions related to the present invention, the portable terminal 20 may include a logic block (for example, a power portion), which is essential to realize the function of the portable terminal, but is not illustrated or described.

The touch panel 31 is disposed on the front surface of the display apparatus 30 overlapping with at least the front surface of the operation key display portion 32, and receives entry operation to operation keys displayed on the operation key display portion 32. In other words, the operation key display portion 32 and the touch panel 31 configure an operation portion. If the operation key display portion 32 itself has a function of a touch panel for receiving entry, the touch panel 31 may not be separately provided, and the operation portion may be configured by only the operation key display portion 32.

The display portion 33 displays various information under control of the control portion 35. For example, the display portion 33 displays a screen for writing and editing an electronic mail document when preparing an electronic mail, and characters in accordance with entry (precisely, contact onto corresponding portions of the touch panel 31) of the operation keys displayed on the operation key display portion 32.

In the embodiments of the present invention, the touch panel 31 is disposed overlapping with the front surface of the display apparatus 30, which configures the operation key display portion 32 and the display portion 33, so that the touch panel 31 can receive entry of various information displayed on the display portion 33, as well as entry of the operation keys displayed on the operation key display portion 32. In other words, the display portion 33 may display information according to entry of a screen displayed on the display portion 33, as well as information according to entry of each of the operation keys displayed on the operation key display portion 32. For example, on a screen of writing and editing an electronic mail document, the display portion 33 displays Kanji conversion candidates for Kana-Kanji conversion according to entry of the operation key display portion 32, and characters (character string) according to entry (precisely, contact onto corresponding portions of the touch panel 31) of displayed Kanji conversion candidates. Accordingly, the display portion 33 may configure an entering portion together with the operation key display portion 32 and the touch panel 31.

The storage portion 34 includes an expected conversion dictionary storage portion 341 and an entry character buffer 342.

The expected conversion dictionary storage portion 341 stores a conversion candidate character string. A conversion candidate character string means a character string, in which a character string entered by a user is mixed with Kanji, or a character string, which several following characters are expected in advance.

The entry character buffer 342 makes a character, which is displayed on the display portion 33 at the time when an entry state of the operation keys is changed, an entry candidate character, and stores an entry candidate character string consisting of at least one entry candidate character. The time that an entry state of the operation keys is changed means the time that contact onto the entry reception range of the operation keys on the touch panel 31 is detected or released.

The control portion 35 includes an area determination portion 351 and a conversion candidate presentation portion 352.

For example, if a user makes a contact onto the touch panel 31 with his/her fingertip, the area determination portion 351 calculates the contact area. If the contact by the user onto the touch panel 31 ranges over the entry reception ranges of a plurality of the operation keys, the area determination portion 351 calculates the contact area for each of the operation keys.

The conversion candidate presentation portion 352 determines whether conversion candidate character strings corresponding to an entry candidate character string stored in the entry character buffer 342 are stored (exists) in the expected conversion dictionary storage portion 341. If the conversion candidate character strings exist, the conversion candidate presentation portion 352 displays a list of the conversion candidate character strings in an alternative manner.

Next, the second embodiment of the present invention will be described below with reference to specific examples. FIG. 17 shows an example of an entry screen in a portable terminal according to a specific example 1 of the second embodiment of the present invention.

As illustrated in (a) of FIG. 17, the portable terminal according to a specific example 1 provides full keys in QWERTY arrangement as an entering portion.

Hereinafter, the case where a user enters "待ち合わせ (matiawase)" in the portable terminal of the specific example 1 will be described. In (a) of FIG. 17, a user is in the state that he/she has entered the characters "mat." In other words, in (a) of FIG. 17, "mat" is stored in the entry buffer 342. Subsequently, in order to enter "i," the user makes a contact onto the touch panel 31 with his/her finger. In this case, as shown in (b) of FIG. 17, there is a case the finger becomes in contact with the operation keys (entry reception ranges) of "o," "k," and "l" disposed adjacent to the operation key of "i."

In the specific example 1, the area determination portion 351 calculates contact areas for all the operation keys, onto which finger's contact has been detected, in the entry reception ranges. The area determination portion 351 also calculates a ratio (hereinafter, a "press ratio") of a contact area to an area of an entry reception range for each of all the keys, onto which finger's contact has been detected, in the entry reception ranges. For example, in case of the state shown in (b) of FIG. 17, the press ratios of the operation keys of "i," "o," "k," and "l" are 52%, 64%, 12%, and 20%, respectively.

The storage portion 34 stores a threshold (for example, 40%) for the press ratio. The control portion 35 compares the press ratio of each of the operation keys and the threshold value stored in the storage portion 34 to decide a character, for which conversion candidates should be presented. For example, in the contact state illustrated in (b) of FIG. 17, since the press ratios of the operation keys of "i" and "o" are each at least 40%, the control portion 35 determines entry of the operation keys of "i" and "o" as entry for which conversion candidates should be presented. The control portion 35 determines the operation key of "o" having the highest press ratio as the first operation portion, and specifies the operation key of "i" having the press ratio exceeding the threshold and lower than the press ratio of the operation key of "o" as the second operation portion.

For each of "mati" and "mato," which are character strings formed by combining "mat" stored in the entry buffer 342 and the character "i" or "o" assigned to the operation key of "i" or "o" determined as an entry, for which conversion candidates should be presented by the control portion 35, the conversion candidate presentation portion 352 prepares a list of conversion candidate character strings with reference to the expected conversion dictionary storage portion 342, and displays the list in an alternative manner as shown in (c) of FIG. 17. In this case, conversion candidate character strings corresponding to "mato" for the operation key of "o" are first displayed on the display portion 33, and subsequently, conversion candidate character strings corresponding to "mati" for the operation key of "i" are displayed on the display portion 33.

The conversion candidate presentation portion 352 assigns a larger display area to the list of conversion candidate character strings corresponding to the character string "mato" using the character "o" assigned to the operation key of "o" having the high press ratio, than the list of conversion candidate character strings corresponding to the character string, "mati" using the character "i" assigned to the operation key of "i."

According to the specific example 1, in the portable terminal using a touch panel, if user's contact onto the touch panel has been detected over a plurality of the operation keys, it is possible to present conversion candidates for a character assigned to an operation key in an alternative manner for all the operation keys having more than a predetermined value for the press ratio. As a result, works for correction to characters due to erroneous entering can be reduced so that efficiency in entering characters can be improved.

Next, a specific example 2 of the second embodiment of the present invention will be described.

Figure 18:
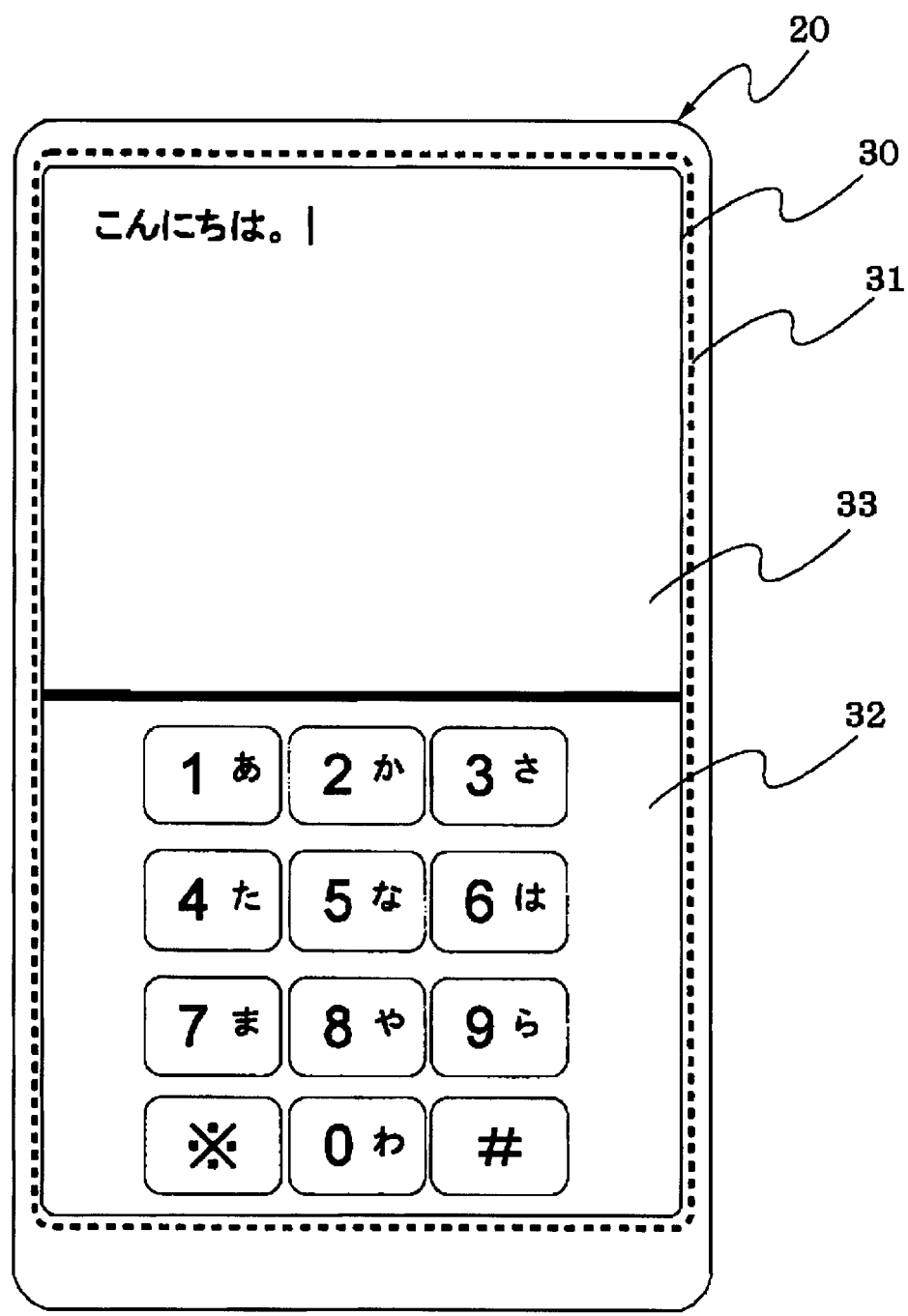
FIG. 18 is a view showing one example of an entry screen of a portable terminal according to a specific example 2 of the second embodiment of the present invention.

FIG. 18 shows one example of an entry screen in a portable terminal according to a specific example 2 of the second embodiment of the present invention.

As shown in FIG. 18, the portable terminal of the specific example 2 provides a number pad as an entering portion. For example, "あ(a)" series (1), "か(ka)" series (2), "さ(sa)" series (3) ... "わ(wa)" series (0) are assigned to the respective keys of the number pad. Depending on the number of times of pressing (making a contact) each of the keys, characters of each of the lines can be displayed in sequence ("あ (a)"→"い (i)"→"う (u)"→"え (e)"→"お (o)"→ "あ (a)→"い (i)"→"う (u)"→"え (e)"→"お (o)", and "か (ka)"→"き (ki)"→"く (ku)"→"け (ke)"→"こ (ko)", etc.), so that desired characters can be entered. By pressing (making a contact) each key for at least a predetermined time (long pressing), characters assigned to the key are displayed in the sequence as described above per a predetermined time during the long pressing of the key. By being apart from the key (releasing the long pressing or releasing contact) during the display of desired characters, desired characters can be entered.

Figure 19:
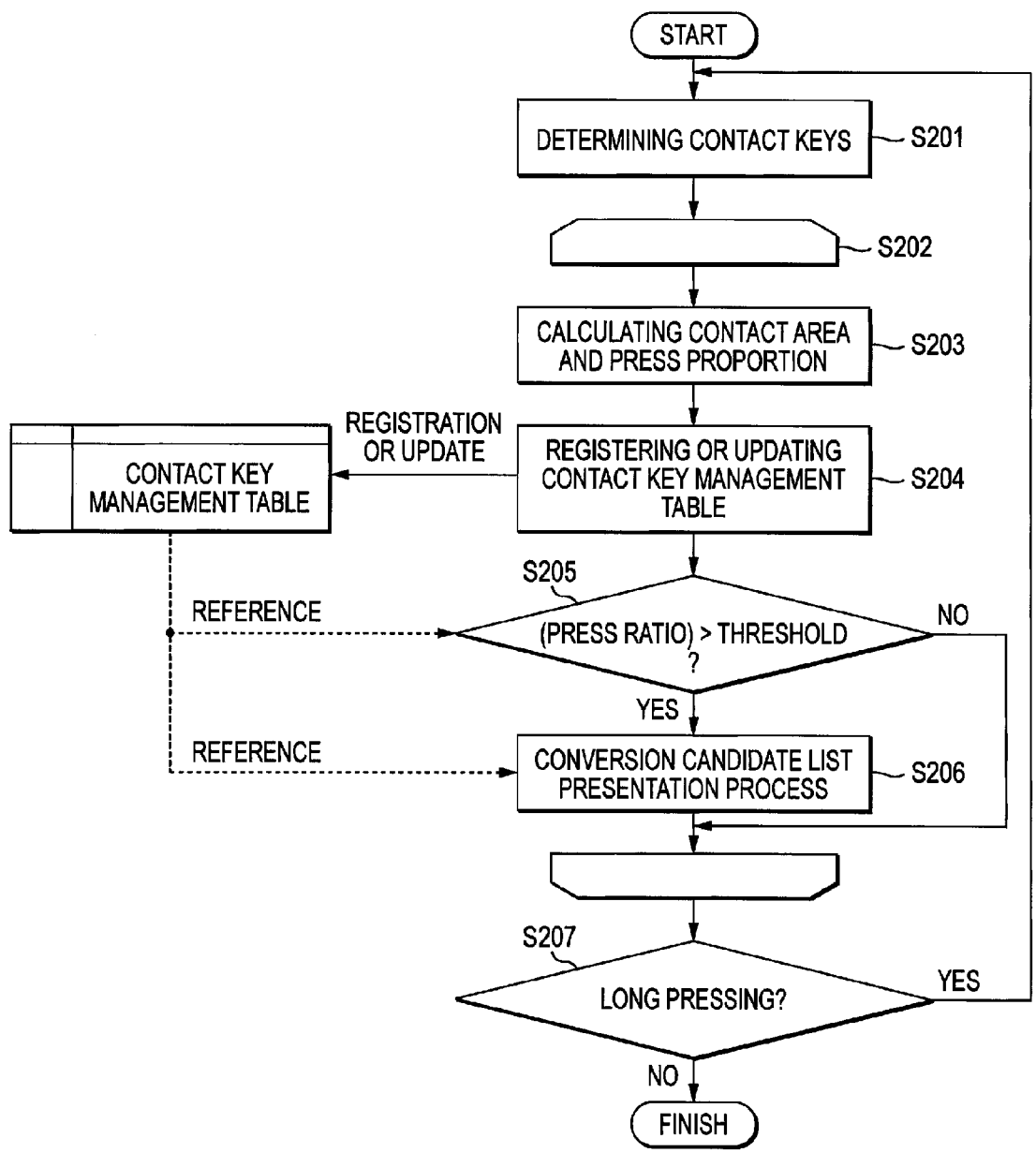
FIG. 19 is a flowchart explaining the flow of processes in the specific example 2 of the second embodiment of the present invention.

FIG. 19 is a flowchart explaining the flow of processes in the portable terminal of the specific example 2.

In S201, if finger's contact onto the touch panel 31 is detected, the control portion 35 determines operation keys (hereinafter, "contact keys") having entry reception ranges, in which the contact position is included.

The control portion 35 performs S202 and the processes following S202 for all the operation keys that have been determined as the contact keys in S201.

In S203, the area determination portion 351 calculates contact areas of the entry reception ranges of the contact keys and press ratios of the contact keys.

In S204, the control portion 35 stores the contact areas and the press ratios of the entry reception ranges of the contact keys in the contact key management table of the storage portion 34. In other words, the control portion 35 associates identifiers (hereinafter, "Key IDs") of the contact keys with the contact areas and the press ratios in the entry ranges of the contact key to store them in the contact key management table. If Key IDs have already been stored in the contact key management table, the control portion 35 updates the contact areas, the press ratios, and the toggle counters that are stored in association with the Key IDs.

FIG. 20 shows one example for the contact key management table. As shown in FIG. 20, the contact key management table stores a contact area, a press ratio, and a toggle counter value for each Key ID of a contact key. The contents stored in the contact key management table are updated when contact onto the operation keys is detected, and deleted when there has been no contact within a predetermined time after contact onto the operation keys is released (after key release), or contact onto a clear key is detected.

The toggle counter is prepared to determine key toggles and counts up to an upper limit of the number of characters assigned to an operation key. For example, 5 characters ("か (ka)", "き (ki)", "く (ku)", "け (ke)", "こ (ko)") of the "か (ka) series" are assigned to the operation key of "2" of the number pad. When entering is detected (in other words, when "か (ka)" is displayed on the display portion 33), "0" is set. For a toggle of "か (ka)→き (ki)," counting is performed to 1. For a toggle of "き (ki)→く (ku)," counting is performed to 2. For a toggle of "け (ke)→こ (ko)," 4 is set. For a toggle of "こ (ko)→か (ka)," 0 is set again. By referencing to toggle counter values, among a plurality of characters assigned to an operation key, a characters to be displayed on the display portion 33 is specified.

In S205, based on the contact key management table, the control portion 35 determines whether the press ratios of the contact keys are at least a predetermined threshold stored in the storage portion 34. If it is determined that the press ratios of the contact keys are at least a predetermined threshold (YES in S205), in S206, the conversion candidate presentation portion 352 prepares a list of conversion candidate character strings for the contact keys with reference to the contact key management table and displays the list on the display portion 33 in an alternative manner.

In S207, if it has been detected that contact onto the touch panel 31 exceeds a predetermined time (long pressing has been determined), the control portion 35 returns to S201 to determine again operation keys (hereinafter, "contact keys") having entry reception ranges, in which the contact position is included, and repeatedly perform the above processes.

The control portion 35 performs a toggle process with reference to toggle counters. The conversion candidate presentation portion 352 prepares and displays conversion candidates by using corresponding characters after the toggle process. The control portion 35 may display operation key candidates and character candidates by assigning priorities thereto depending on press ratios or display them by changing the display number of the respective character candidates.

FIG. 21 is a view showing screen transition in the case where the processes according to the flowchart illustrated in FIG. 19 have been performed in the portable terminal of the specific example 2.

In the entering device of the specific example 2, to order to enter "今から(いま から): (imakara)," a user makes a contact onto the operation key "1," to which the characters of the "あ (a) series" are assigned, with his/her finger. In this case, as shown in (a) of FIG. 21, assuming that the user's finger has become also in contact with the operation key "2," to which the characters of the "か (ka)" series are assigned, the area determination portion 351 calculates a contact area and a press ratio for each of the operation keys "1" and "2."

Subsequently, the control portion 35 determines whether a Key ID for each of the operation keys "1" and "2" has been registered in the operation key management table. If a Key ID for each of the operation keys "1" and "2" has not been registered in the operation key management table, the control portion 35 newly registers a Key ID for each of the operation keys and the contact area and the press ratio calculated for each of the operation keys in the contact key management table. In this case, toggle counters corresponding to the operation keys "1" and "2" in the contact key management table are set as 0.

As shown in (a) of FIG. 21, if the press ratio of the operation key "1" has been 60%, and the press ratio of the operation key "2" has been 45%, the control portion 35 displays "あ (a)," which is a character of the "あ (a) series" assigned to the operation key "1" having the highest press ratio, and corresponds to the toggle counter value "0" set in the contact key management table, on the display portion 33. In this case, as shown in (c) of FIG. 21, the conversion candidate presentation portion 352 presents a list of conversion candidate character strings for the entry candidate character, "あ (a)" together with a list of conversion candidate character strings for the character "か (ka)," which is a character of the "か (ka) series" assigned to the operation key "2" having more than 40% of the press ratio, and corresponds to the toggle counter value "0" set in the contact key management table.

In the touch panel 31, if contact has not been released during elapse of a predetermined time after contact by a user is detected (in other words, long pressing has been detected), the area determination portion 351 calculates contact areas again. In this case, assuming that the user has slightly moved his/her finger's position during the long pressing, so that the state of the contact onto the touch panel 31 has been changed from the state illustrated in (a) of FIG. 21 to the state illustrated in (b) of FIG. 21 (the state that contact onto the touch panel 31 is only included in the entry reception range of the operation key "1"), the control portion 35 updates the entry candidate character "あ (a)" displayed on the display portion 33 to "い (i)," which is a character of the "あ (a) series" assigned to the operation key "1" and corresponds to the toggle counter value "1" set in the contact key management table. In this case, as shown in (d) of FIG. 21, the conversion candidate presentation portion 352 only presents a list of conversion candidate character strings for the entry candidate character "い (i)" and finishes presenting a list of conversion candidate character strings for the character "か (ka)."

According to the second embodiment of the present invention, if a user's contact onto the touch panel has been detected over a plurality of the operation keys, conversion candidates for all the operation keys having at least a predetermined threshold of contact areas are presented in an alternative manner by using characters assigned to the operation keys. In other words, if there are a plurality of operation portions (operation keys), to which operation has been detected, the control portion displays character information about a character assigned to each of the plurality of operation portions (operation keys), to which operation has been detected, on the display portion. As a result, works for correction to characters due to erroneous entering can be reduced, so that efficiency in entering characters is improved. Further, it is possible to specify a second operation portion for each of the plurality of operation portions, to which operation has been detected, as in the first embodiment. The control portion can specify one of a plurality of the operation portions, to which operation has been detected, as a second operation portion as the first operation portion of the first embodiment, and controls display of character information about a character assigned to the second operation portion on the display portion. As a result of the control, efficiency in entering characters can be more improved.

In the entering device, in which by using a touch panel and performing long pressing an operation key, to which a plurality of characters are assigned, the plurality of characters assigned to the operation key are toggled, so that desired characters are selected as entry candidate characters, when entry candidate characters are changed by toggling, presenting of a list of conversion candidate character strings is updated based on the operation key, onto which contact has been detected. In other words, if it is detected that operation to a plurality of operation portions (operation keys) has been performed for a time exceeding a predetermined time, the operation detection portion updates the detection of the operation states of the plurality of operation portions (operation keys). The control portion updates character information displayed on the display portion depending on the updated operation states. As a result, a list of conversion candidates can always be presented in an alternative manner depending on the operation states of the operation keys, so that works for corrosion to characters due to erroneous entering can be reduced. Further, in the first embodiment, if it is detected that operation to a plurality of operation detection portions has been performed for a time exceeding a predetermined time, the control portion may update the detection of the operation states and perform controls such as determination of operation to the first operation portion when the detection of the operation states is updated. As a result, conversion candidates can be more effectively obtained.

The embodiments of the present invention have been described. However, the present invention is not limited thereto, and design modification to the specific configuration of each of the components is possible. Further, combining the configuration of each of the embodiments, the configuration of each of the specific examples, and the configuration of each of the modified examples is also possible. The operation and effect of each of the embodiments, the specific examples, and the modified examples are merely the most preferable operation and effect that result from the present invention. The operations and effects of the present invention are not limited to those described in the embodiments, the specific examples, and the modified examples.

The present application is based on Japanese Patent Application No. 2008-220581 filed on Aug. 28, 2008, and Japanese Patent Application No. 2008-247773 filed on Sep. 26, 2008, the disclosures of which are herein incorporated by reference.

INDUSTRIAL APPLICABILITY

The display apparatus of the present invention can be applied to various display apparatuses adopting a touch panel, such as PDAs (Personal Digital Assistant) and automated teller machines, in addition to portable terminals such as portable telephones.

DESCRIPTION OF REFERENCE NUMERALS

10 . . . portable terminal, 11 . . . antenna, 12 . . . communication portion, 13 . . . control portion, 14 . . . storage portion, 15 . . . voice input and output portion, 15a . . . speaker, 15b . . . microphone, 16 . . . touch panel, 100 . . . case, 100F . . . top surface, 101 . . . hole, 102 . . . hole, 161 . . . glass substrate, 162 . . . film, 163 . . . ITO, 164 . . . spacer, 20 . . . portable terminal, 30 . . . display apparatus, 31 . . . touch panel, 32 . . . operation key display portion, 33 . . . display portion, 34 . . . storage portion, 341 . . . expected conversion dictionary storage portion, 342 . . . entry character buffer, 35 . . . control portion, 351 . . . area determination portion, 352 . . . conversion candidate presentation portion.

The invention claimed is:

1. A display apparatus comprising:
a display part;
a plurality of keys, to which different characters are assigned, respectively, and which are provided adjacent to one another;
an operation detection part which detects operation states to the plurality of keys; and
a control part which controls the display part to display an expected candidate about a character assigned to a key, to which an operation is detected by the operation detection part,
wherein if it is determined that a first key among the plurality of keys is operated based on detection of an operation state by the operation detection part:
the control part controls the display part to display an expected candidate about a first character assigned to the first key on the display part, an initial character of the expected candidate about the first character being the first character, and
the control part specifies a second key adjacent to the first key based on the operation state to the first operation portion, and displays expected candidate about a second character assigned to the second key on the display part, an initial character of the expected candidate about the second character being the second character, and
if a third character assigned to a third key of the plurality of keys is input as a subsequent character, by operating the third key before deciding of one of the expected candidate about the first character and the expected candidate about the second character:
the control part controls the display part to display an expected candidate, the initial character of which is the first character assigned to the first key and the subsequent character of which is one of the third character assigned to the third key and a fourth character assigned to a fourth key, which is adjacent to the third key, while displaying no expected candidate, the initial character of which is the second character assigned to the second key.

2. The display apparatus according to claim 1,
wherein the control part displays, as the expected candidate, a character conversion candidate or an expected character entry candidate for a character assigned to the key on the display part.

3. The display apparatus according to claim 1,
wherein the operation detection part detects an operation position to the first key as the operation state to the first key, and
wherein the control part specifies the second key based on the operation position to the first key.

4. The display apparatus according to claim 1,
wherein the second key is a key provided immediately adjacent to the first key.

5. The display apparatus according to claim 4,
wherein the operation detection part detects an operation position to the first key, and
wherein the control part specifies the second key based on a distance between the operation position to the first key and a key immediately adjacent to the first key.

6. The display apparatus according to claim 1,
wherein the operation detection part detects an operation range to the plurality of keys as the operation states to the plurality of keys, and
wherein the control part determines an operation to the first key based on the operation range detected by the operation detection part.

7. The display apparatus according to claim 6,
wherein the control part specifies the second key based on an operation range to the first key from the operation range detected by the operation detection part.

8. The display apparatus according to claim 1,
wherein the control part displays the expected candidate about the character assigned to the first key and the expected candidate about the character assigned to the second key in different modes, on the display part.

9. The display apparatus according to claim 1,
wherein if a predetermined condition is met, the control part specifies one of the first key and the second key as a predetermined key, and displays the expected candidate about the character assigned to the predetermined key on the display part, and
wherein the control part restricts display of the expected candidate about the character assigned to a key other than the predetermined key and included in the first key and the second key, on the display part.

10. The display apparatus according to claim 1,
wherein each time an operation to the first key is detected by the operation detection part, the control part specifies the second key, and displays the expected candidate about the character assigned to the first key and the expected candidate about the character assigned to the specified second key, on the display part.

11. The display apparatus according to claim 1,
wherein if there are a plurality of keys, to which an operation is detected by the operation detection part, the control part displays an expected candidate about a character assigned to each of the plurality of detected keys, on the display part.

12. The display apparatus according to claim 1,
wherein if it is detected that an operation to the plurality of keys is performed for a time exceeding a predetermined time, the operation detection part updates the operation states to the plurality of keys, and
wherein the control part updates the expected candidate displayed on the display part in accordance with the updated operation states.

13. The display apparatus according to claim 1,
wherein if there is a record of correction to the expected candidate displayed based on an operation to the first key, the control part displays the expected candidate about the character assigned to the second key, on the display part.

14. The display apparatus according to claim 1,
wherein the plurality of keys are provided on a same plane surface.

15. The display apparatus according to claim 14,
wherein the display apparatus includes a touch panel having the plurality of keys and the display part, and
wherein the operation detection part detects a contact operation to the touch panel.

16. A display method in a display apparatus including a display part, a plurality of keys to which different characters are assigned, respectively, and which are provided adjacent to one another, an operation detection part which detects operation states to the plurality of keys, and a control part which controls the display part to display an expected candidate about a character assigned to a key, to which an operation is detected by the operation detection part, the display method comprising:
if it is determined that a first key among the plurality of keys is operated based on detection of an operation state by the operation detection part, displaying an expected candidate about a first character assigned to the first key, an initial character of the expected candidate about the first character being the first character and an expected candidate about a second character assigned to a second key specified adjacent to the first key, on the display part, an initial character of the expected candidate about the second character being the second character, and if a third character assigned to a third key of the plurality of keys is input as a subsequent character, by operating the third key before deciding of one of the expected candidate about the first character and the expected candidate about the second character, the control part controls the display part to display an expected candidate, the initial character of which is the first character assigned to the first key and the subsequent character of which is one of the third character assigned to the third key and a fourth character assigned to a fourth key, which is adjacent to the third key, while displaying no expected candidate, the initial character of which is the second character assigned to the second key.

17. The display apparatus according to claim 1,
wherein, with the operation of the one key, the control part selects and decides the expected candidate, the initial character of which is the first character assigned to the first key.

18. The display apparatus according to claim 1,
wherein, with the operation of the one key, the control part ceases the display of the expected candidate about a second character assigned to the second key on the display part.

19. The display method according to claim 16,
wherein, with the operation of the one key, the control part selects and decides the expected candidate, the initial character of which is the first character assigned to the first key.

20. The display method according to claim 16,
wherein, with the operation of the one key, the control part ceases the display of the expected candidate about a second character assigned to the second key on the display part.

\* \* \* \* \*